US012783931B2

(12) United States Patent
Johnson et al.

(10) Patent No.: US 12,783,931 B2
(45) Date of Patent: Nov. 3, 2026

(54) QUANTUM COMPUTER WITH IMPROVED QUANTUM OPTIMIZATION BY EXPLOITING MARGINAL DATA

(71) Applicant: Zapata Computing, Inc., Boston, MA (US)

(72) Inventors: Peter Douglas Johnson, Portland, ME (US); Maxwell D. Radin, Cambridge, MA (US); Jhonathan Romero, Somerville, MA (US); Yudong Cao, Cambridge, MA (US); Amara Katabarwa, Cambridge, MA (US)

(73) Assignee: Zapata Computing, Inc., Boston, MA (US)

( * ) Notice: Subject to any disclaimer, the term of this patent is extended or adjusted under 35 U.S.C. 154(b) by 726 days.

(21) Appl. No.: 18/131,077

(22) Filed: Apr. 5, 2023

(65) Prior Publication Data

US 2023/0289636 A1 Sep. 14, 2023

Related U.S. Application Data

(62) Division of application No. 16/543,165, filed on Aug. 16, 2019, now abandoned.

(Continued)

(51) Int. Cl.
*G06N 10/60* (2022.01)
*G02F 1/017* (2006.01)
(Continued)

(52) U.S. Cl.
CPC ......... *G06N 10/60* (2022.01); *G02F 1/01791* (2021.01); *G06F 17/14* (2013.01);
(Continued)

(58) Field of Classification Search
CPC ........ G06N 10/00; G06N 10/20; G06N 10/40; G06N 10/60; G06N 10/70; G06N 10/80
See application file for complete search history.

(56) References Cited

U.S. PATENT DOCUMENTS 7,353,148 B1 4/2008 Meyers
9,663,358 B1 5/2017 Cory
(Continued)

FOREIGN PATENT DOCUMENTS

CA 3151055 C 8/2022
CA 3133917 C 3/2023
(Continued)

OTHER PUBLICATIONS

O'Malley et al., "Scalable Quantum Simulation of Molecular Energies", Feb. 4, 2017, arxiv.com, pp. 1-13 (Year: 2017).*
(Continued)

*Primary Examiner* — Paulinho E Smith
(74) *Attorney, Agent, or Firm* — Young Basile Hanlon & MacFarlane, P.C.

(57) ABSTRACT

A quantum optimization system and method for improving performance of variational quantum algorithms using classical post-processing of a measured quantum state. A classical computer estimates, for a quantum state, an expectation value of a Hamiltonian based on expectation values of the observables. The Hamiltonian may be expressed as a linear combination of the observables. The classical computer transforms one or both of the Hamiltonian and the quantum state to reduce the expectation value of the Hamiltonian.

19 Claims, 5 Drawing Sheets

Related U.S. Application Data

(60) Provisional application No. 62/719,330, filed on Aug. 17, 2018.

(51) Int. Cl.
*G06F 17/14* (2006.01)
*G06N 10/20* (2022.01)
*G06N 10/40* (2022.01)
*G06N 10/70* (2022.01)

(52) U.S. Cl.
CPC ............. *G06N 10/20* (2022.01); *G06N 10/40* (2022.01); *G06N 10/70* (2022.01)

(56) References Cited

U.S. PATENT DOCUMENTS

| | | | | |
|---|---|---|---|---|
| 10,044,638 | B2 | 8/2018 | Dadashikelayeh | |
| 10,469,087 | B1 | 11/2019 | Granade et al. | |
| 10,755,191 | B2 | 8/2020 | Shim | |
| 10,832,155 | B2 | 11/2020 | Lechner | |
| 10,922,460 | B1 | 2/2021 | Lee | |
| 10,949,768 | B1 | 3/2021 | Zeng | |
| 11,106,993 | B1 | 8/2021 | Dallaire-Demers et al. | |
| 11,157,827 | B2 | 10/2021 | Sim | |
| 11,468,289 | B2 | 10/2022 | Cao et al. | |
| 11,604,644 | B1 * | 3/2023 | Rubin | G06N 10/80 |
| 11,605,015 | B2 | 3/2023 | Anschuetz | |
| 11,615,329 | B2 | 3/2023 | Wang et al. | |
| 11,636,370 | B2 | 4/2023 | Romero | |
| 12,056,577 | B1 * | 8/2024 | Rubin | G06N 10/80 |
| 2007/0239366 | A1 | 10/2007 | Hilton | |
| 2007/0288684 | A1 | 12/2007 | Bergou | |
| 2010/0306142 | A1 | 12/2010 | Amin | |
| 2014/0187427 | A1 | 7/2014 | Macready | |
| 2015/0032994 | A1 | 1/2015 | Chudak | |
| 2015/0262072 | A1 | 9/2015 | Stoltz | |
| 2015/0317558 | A1 | 11/2015 | Adachi | |
| 2015/0363708 | A1 | 12/2015 | Amin | |
| 2016/0004972 | A1 | 1/2016 | Alboszta | |
| 2016/0042294 | A1 | 2/2016 | Macready | |
| 2016/0328253 | A1 | 11/2016 | Majumdar | |
| 2017/0177751 | A1 | 6/2017 | Macready | |
| 2017/0177782 | A1 | 6/2017 | Hastings | |
| 2017/0223094 | A1 | 8/2017 | Johnson | |
| 2017/0262765 | A1 | 9/2017 | Bourassa | |
| 2017/0351967 | A1 | 12/2017 | Babbush | |
| 2017/0357539 | A1 | 12/2017 | Dadashikelayeh | |
| 2017/0364362 | A1 | 12/2017 | Lidar | |
| 2017/0364796 | A1 | 12/2017 | Wiebe | |
| 2018/0053112 | A1 * | 2/2018 | Bravyi | G06N 10/40 |
| 2018/0129965 | A1 | 5/2018 | Bocharov | |
| 2018/0165601 | A1 | 6/2018 | Wiebe | |
| 2018/0232649 | A1 | 8/2018 | Wiebe | |
| 2018/0232652 | A1 | 8/2018 | Curtis | |
| 2018/0246851 | A1 | 8/2018 | Zaribafiyan | |
| 2018/0247200 | A1 | 8/2018 | Rolfe | |
| 2018/0260731 | A1 * | 9/2018 | Zeng | G06N 10/60 |
| 2018/0322408 | A1 | 11/2018 | Chen | |
| 2018/0330264 | A1 | 11/2018 | Lanting | |
| 2019/0147359 | A1 | 5/2019 | Chen | |
| 2019/0164079 | A1 | 5/2019 | Gambetta | |
| 2019/0197358 | A1 | 6/2019 | Madani | |
| 2019/0205783 | A1 | 7/2019 | Nam | |
| 2019/0213495 | A1 | 7/2019 | Babbush | |
| 2019/0236476 | A1 | 8/2019 | Pereverzev | |
| 2019/0251466 | A1 | 8/2019 | Mezzacapo | |
| 2019/0354897 | A1 * | 11/2019 | Horesh | G06N 20/00 |
| 2019/0384597 | A1 * | 12/2019 | Horesh | G06F 9/3001 |
| 2019/0393399 | A1 | 12/2019 | Leipold | |
| 2020/0005186 | A1 * | 1/2020 | Romero | G06N 10/60 |
| 2020/0057957 | A1 | 2/2020 | Johnson | |
| 2020/0097848 | A1 | 3/2020 | Woerner | |
| 2020/0117702 | A1 | 4/2020 | Babbush | |
| 2020/0118025 | A1 | 4/2020 | Romero | |
| 2020/0134502 | A1 | 4/2020 | Anschuetz | |
| 2020/0151073 | A1 | 5/2020 | Kelly | |
| 2020/0274554 | A1 | 8/2020 | Aspuru-Guzik | |
| 2020/0293937 | A1 * | 9/2020 | Babbush | G06N 10/40 |
| 2020/0334107 | A1 | 10/2020 | Katabarwa | |
| 2020/0394537 | A1 | 12/2020 | Wang | |
| 2020/0394549 | A1 * | 12/2020 | Dallaire-Demers | G06N 10/80 |
| 2020/0410384 | A1 | 12/2020 | Aspuru-Guzik | |
| 2021/0034998 | A1 | 2/2021 | Cao | |
| 2021/0073668 | A1 | 3/2021 | Dallaire-Demers | |
| 2021/0125096 | A1 | 4/2021 | Puri | |
| 2021/0133617 | A1 | 5/2021 | Sim | |
| 2021/0166148 | A1 * | 6/2021 | Matsuura | G06N 10/20 |
| 2021/0182726 | A1 | 6/2021 | Harry Putra | |
| 2021/0232963 | A1 | 7/2021 | Gimeno-Segovia | |
| 2021/0256351 | A1 | 8/2021 | Yudong | |
| 2021/0271731 | A1 | 9/2021 | Stobinska | |
| 2021/0272002 | A1 | 9/2021 | Dallaire-Demers | |
| 2021/0287761 | A1 | 9/2021 | Camps | |
| 2021/0312313 | A1 | 10/2021 | Woerner | |
| 2022/0188679 | A1 | 6/2022 | Mazzola | |
| 2022/0284337 | A1 | 9/2022 | Radin | |
| 2022/0292385 | A1 | 9/2022 | Sauvage | |
| 2022/0335325 | A1 | 10/2022 | Dallaire-Demers | |
| 2022/0383177 | A1 | 12/2022 | Alcazar | |
| 2023/0081927 | A1 | 3/2023 | Zhang | |
| 2023/0131510 | A1 | 4/2023 | Cao | |
| 2023/0147890 | A1 | 5/2023 | Cao | |

FOREIGN PATENT DOCUMENTS

| | | | |
|---|---|---|---|
| CN | 114223003 | A | 3/2022 |
| EP | 3504667 | | 7/2019 |
| EP | 4022530 | | 7/2022 |
| EP | 4026066 | | 7/2022 |
| EP | 4026066 | A1 | 7/2022 |
| EP | 4042338 | A1 | 8/2022 |
| EP | 4052194 | | 9/2022 |
| EP | 4104114 | A1 | 12/2022 |
| EP | 4128085 | A2 | 2/2023 |
| EP | 4154193 | A1 | 3/2023 |
| JP | 7223174 | B2 | 2/2023 |
| KR | 20120016381 | A | 2/2012 |
| KR | 20160132943 | A | 11/2016 |
| KR | 20160147988 | A | 12/2016 |
| KR | 101822326 | B1 | 1/2018 |
| TW | 201723935 | A | 7/2017 |
| TW | 201945962 | A | 12/2019 |
| TW | I764348 | B | 5/2022 |
| WO | 2015069625 | A1 | 5/2015 |
| WO | 2017001404 | A1 | 1/2017 |
| WO | 2017027185 | A1 | 2/2017 |
| WO | 2017066695 | A1 | 4/2017 |
| WO | 2018064535 | A1 | 4/2018 |
| WO | 2018212789 | A1 | 11/2018 |
| WO | 2019032103 | A1 | 2/2019 |
| WO | 2019050555 | A1 | 3/2019 |
| WO | 2019055843 | A1 | 3/2019 |
| WO | 2019077240 | A1 | 4/2019 |
| WO | 2019104443 | A1 | 6/2019 |
| WO | 2019126644 | A1 | 6/2019 |
| WO | 2019150090 | A1 | 8/2019 |
| WO | 2019177951 | A1 | 9/2019 |
| WO | 2019209628 | A1 | 10/2019 |
| WO | 2019220122 | A1 | 11/2019 |
| WO | 2020037253 | A1 | 2/2020 |
| WO | 2020077288 | A1 | 4/2020 |
| WO | 2020086867 | A1 | 4/2020 |
| WO | 2020168158 | A1 | 8/2020 |
| WO | 2020214910 | A1 | 10/2020 |
| WO | 2020252425 | A1 | 12/2020 |
| WO | 2021022217 | A1 | 2/2021 |
| WO | 2020077288 | A9 | 3/2021 |
| WO | 2021046495 | A1 | 3/2021 |
| WO | 2021062331 | A1 | 4/2021 |
| WO | 2021087206 | A1 | 5/2021 |
| WO | 2021102344 | A1 | 5/2021 |
| WO | 2021163487 | A1 | 8/2021 |
| WO | 2021247125 | A2 | 12/2021 |
| WO | 2022087143 | A1 | 4/2022 |

(56) References Cited

FOREIGN PATENT DOCUMENTS

| | | | |
|---|---|---|---|
| WO | 2022155277 | A1 | 7/2022 |
| WO | 2022173497 | A2 | 8/2022 |
| WO | 2022173497 | A9 | 9/2022 |
| WO | 2022187503 | A1 | 9/2022 |
| WO | 2022192525 | A1 | 9/2022 |
| WO | 2023043996 | A1 | 3/2023 |

OTHER PUBLICATIONS

McClean et al., "The theory of variational hybrid quantum-classical algorithms", Feb. 5, 2016, New Journal of Physic, vol. 18, pp. 1-22 (Year: 2016).*

Preskill, J., "Quantum Computing in the NISQ era and beyond", pp. 1-20 (Jul. 31, 2018).

Purvis, G.D., et al., "A full coupled-cluster singles and doubles model: The inclusion of disconnected triples", The Journal of Chemical Physics, vol. 76, No. 4, pp. 1910-1918 (Feb. 15, 1982).

Quantum Information Software Kit (QISKit), https://qiskit.org/ (2018).

R. L. Fox et al., "Rates of change of eigenvalues and eigenvectors," AIAA Journal 6. 12 (1968), pp. 2426-2429.

Radford, A., et al., "Unsupervised Representation Learning with Deep Convolutional Generative Adversarial Networks", arXiv preprint arXiv:1511.06434, pp. 1-16 (2015).

Reiher, M., et al., "Elucidating Reaction Mechanisms on Quantum Computers", PNAS, vol. 114, No. 29, pp. 1-28 (2016).

Rice, J.E., et al., "Quantum computation of dominant products in lithium-sulfur batteries," The Journal of Chemical Physics, 154(13):134115, 2021. arxiv2001.01120, pp. 1-7 (Jan. 4, 2020).

Robbins, K., and Love, P.J., "Benchmarking VQE with the LMG model," arXiv: 2105.06761 [quant-ph]. pp. 1-15 (Aug. 2, 2021).

Robert M. Parrish et al., "Psi4 1.1: An Open-Source Electronic Structure Program Emphasizing Automation, Advanced Libraries, and Interoperability," J. Chem. Theory Comput. 13.7 (2017), pp. 3185-3197. doi: 10.1021/acs.jctc.7b00174. url: http://dx.doi.org/10.1021/acs.jctc.7b00174.

Rodriguez-Lujan, I., et al., "Quadratic Programming Feature Selection", The Journal of Machine Learning Research, vol. 11, pp. 1491-1516 (2010).

Rolfe, J.T., "Discrete Variational Autoencoders", ICLR, pp. 1-33 (Apr. 22, 2017).

Romero et al., "Quantum autoencoders for efficient compression of quantum data", arXiv:1612.02806v2, Feb. 10, 2017, 11 pages. . [retrieved on Jan. 20, 2020]. Retrieved from <https://arxiv.org/abs/1612.02806>.

Romero, J., and Aspuru-Guzik, A., "Variational quantum generators: Generative adversarial quantum machine earning for continuous distributions", Quantum Physics, arXiv:1901.00848 [quant-ph], pp. 1-15 (Jan. 3, 2019).

Romero, J., et al., "Quantum autoencoders for efficient compression of quantum data", Quantum Science and Technology, vol. 2 (4):045001, pp. 1-10 (Feb. 10, 2017).

Romero, J., et al., "Strategies for quantum computing molecular energies using the unitary coupled cluster ansatz", arXiv:1701.02691v2 [quant-ph], vol. 4, No. 4, pp. 1-18 (Feb. 10, 2018).

Roth, R. M., et al., "Apathy Is Associated with Ventral Striatum Volume in Schizophrenia Spectrum Disorder", J Neuropsychiatry Clin Neurosci, 2016 Summe, vol. 28, No. 3, pp. 1-9 (Published online Feb. 22, 2016. doi: 10.1176/appi.neuropsych.15100241).

Rubin, N. C., et al., "Application of Fermionic Marginal Constraints to Hybrid Quantum Algorithms", New Journal of Physics, vol. 20, No. 5, 053020, pp. 1-21 (2018).

Rubin, N.C., "A Hybrid Classical/Quantum Approach for Large-Scale Studies of Quantum Systems with Density Matrix Embedding Theory", Quantum Physics, arXiv:1610.06910 [quant-ph], pp. 1-10, (2016).

Rusu, A. A., et al., "Meta-learning with latent embedding optimization," arXiv:1807.05960, pp. 1-17 (Mar. 26, 2019).

Ryan Babbush et al., "Low Depth Quantum Simulation of Electronic Structure," Phys. Rev. X 8, 011044 (2018) 37 pages. Available online at <https://arxiv.org/pdf/1706.00023v2.pdf>.

Sanchez-Lengeling, B., and Aspuru-Guzik, A., "Inverse molecular design using machine learning: Generative models for matter engineering", Science 27, vol. 361, No. 6400, pp. 360-365 (Jul. 27, 2018).

Sanchez-Lengeling, B., et al., "Optimizing distributions over molecular space. An Objective-Reinforced Generative Adversarial Network for Inverse-design Chemistry (ORGANIC)", ChemRxiv preprint chemrxiv.5309668.v2, pp. 1-20 (2017).

Sarma, S.D., et al., "Majorana Zero Modes and Topological Quantum Computation", arXiv: 1501.02813v2, pp. 1-16, May 14, 2015 (retrieved on Nov. 17, 2019). Retrieved from <https://arxiv.org/abs/1501.02813>.

Sauvage, F., et al., "Flip: A flexible initializer for arbitrarily-sized parametrized quantum circuits," https://arxiv.org/abs/2103.08572v2, 15 pages, (May 5, 2021).

Schlittgen, B., et al., "Low-Energy Effective Theories of Quantum Spin and Quantum Link Models", Physical Review D, vol. 63. No. 8, pp. 1-29 (Mar. 19, 2001).

Schuch, N. and Verstraete, F., "Computational Complexity of interacting electrons and fundamental limitations of Density Functional Theory", Nature Physics, DOI: 10.1038/NPHYS1370, pp. 732-735 (Aug. 23, 2009).

Schuld, M., et al., "Circuit-centric quantum classifiers", arXiv:1804.00633v1, pp. 1-17 (Apr. 2, 2018).

Schuld, M., et al., "Evaluating analytic gradients on quantum hardware", arXiv preprint arXiv:1811.11184v1, pp. 1-8 (2018).

Schuld, M., et al., "Quantum machine learning in feature Hilbert spaces", Quantum Physics, arXiv:1803.07128, pp. 1-12 (Mar. 19, 2018).

Second Examination Report mailed Aug. 2, 2022, in Canadian patent application No. 3,133,917, 3 pages.

Second Office Action mailed Apr. 6, 2022, in Taiwan patent application No. 109139876, 3 pages (English translation included).

Seeley, J.T., et al., "The Bravyi-Kitaev transformation for quantum computation of electronic structure," The Journal of chemical physics, 137(22):224109, 2012. arXiv:1208.5986, pp. 1-38 (Aug. 29, 2012).

Sepiol, M.A., "A High-Fidelity Microwave Driven Two-Qubit Quantum Logic Gate in 43Ca+", pp. 1-197 (2016).

Sergeevich, A., et al., "Characterization of a Qubit Hamiltonian Using Adaptive Measurements in a Fixed Basis", arXiv:1102.3700v2, pp. 1-6 (Nov. 23, 2011).

Shor, P.W., "Algorithms for quantum computation: Discrete logarithms and factoring", Proceedings 35th Annual Symposium on Foundations of Computer Science (Shafi Goldwasser, ed.), IEEE, pp. 124-134 (1994).

Sim, S., et al., "A framework for algorithm deployment on cloud-based quantum computers", arXiv preprint arXiv:1810.10576v1, pp. 1-10 (Oct. 24, 2018).

Sim, S., et al., "Adaptive pruning-based optimization of parameterized quantum circuits," Quantum Science and Technology 10.1088/2058-9565/abe107 (2021) pp. 1-24, arXiv:2010.00629.

Sim, S., et al., "Expressibility and Entangling Capability of Parameterized Quantum Circuits for Hybrid Quantum-Classical Algorithms", arXiv:1905.10876v1, pp. 1-18 (May 26, 2019) Available online at <URL: https://arxiv.org/abs/1905.10876v1.pdf>.

Situ, H., et al., "Quantum generative adversarial network for discrete data", arXiv preprint arXiv:1807.01235v5, pp. 1-22 (2019).

Skolik, A., et al., "Layerwise learning for quantum neural networks," arXiv:2006.14904, vol. 3, No. 5 pp. 1-11 (Jun. 26, 2020).

Smith, R. S., et al., "A Practical Quantum Instruction Set Architecture", arXiv preprint arXiv:1608.03355v2, pp. 1-15 (2016).

Soklakov, A. N., and Schack, R., "Efficient state preparation for a register of quantum bits", Phys. Rev. A, 012307, arXiv:quant-ph/0408045v2, vol. 73, No. 1, pp. 1-26 (Nov. 22, 2005).

Somma, R. D., "Quantum eigenvalue estimation via time series analysis," New Journal of Physics, 21(12):123025, 2019. arXiv:1907.11748, pp. 1-10 (Sep. 4, 2020).

(56) References Cited

OTHER PUBLICATIONS

Somma, R. D., et al., "Spectral gap amplification," SIAM Journal on Computing, 42(2):593-610, 2013. arXiv:1110.2494, pp. 1-14 (Mar. 30, 2012).
Spall, J. C., "A one-measurement form of simultaneous perturbation stochastic approximation", Automatica, vol. 33, No. 1, pp. 109-112 (1997).
Spall, J. C., "Adaptive stochastic approximation by the simultaneous perturbation method", IEEE Transactions on Automatic Control, vol. 45, No. 10, pp. 1839-1853 (Oct. 2000).
Spall, J.C., "A Stochastic Approximation Technique for Generating Maximum Likelihood Parameter Estimates", in 1987 American Control Conference, pp. 1161-1167 (1987).
Srednicki, M., "Chaos and quantum thermalization", Phys. Rev. E, vol. 50, No. 2, 888, pp. 1-30 (Apr. 1, 1994).
Steane, A., "Multiple Particle Interference and Quantum Error Correction", Proceedings of the Royal Society A, the royal Society, vol. 452, Issue. 1954, pp. 2551-2577 (Nov. 8, 1996).
Steiger, D. S., et al., "ProjectQ: An Open Source Software Framework for Quantum Computing", Quantum, arXiv:1612.08091v2, vol. 2, pp. 1-13 (2016).
Brandao, F.G., et al., "For fixed control parameters the quantum approximate optimization algorithm's objective function value concentrates for typical instances," arXiv preprint arXiv:1812.04170, pp. 1-16 (2018).
Brassard, G., et al., "Quantum Amplitude Amplification and Estimation", arXiv:quant-ph/0005055v1, pp. 1-22 (May 15, 2000).
Bravo-Prieto, C., et al., "Variational Quantum Linear Solver," Quantum Physics, arXiv:1909.05820, pp. 1-21 (Sep. 12, 2019).
Bravyi, S., "Lagrangian Representation for Fermionic Linear Optics", arXiv:quant-ph/0404180v2, pp. 1-12 (Sep. 20, 2004).
Bravyi, S.B., et al., "Fermionic Quantum Computation", Annals of Physics, vol. 298, No. 1, pp. 210-226 (2002).
Broughton, M., et al., "Tensorflow quantum: A software framework for quantum machine learning," arXiv preprint arXiv:2003.02989, pp. 1-56 (Aug. 26, 2021).
Cai, X., et al., "Quantum computation of molecular response properties," Physical Review Research, pp. 1-7 (Aug. 27, 2020).
Cao, Y., et al., "Implementation of a Toffoli gate using an array of coupled cavities in a single step", Scientific Reports, vol. 8, Article No. 5813, pp. 1-10 (Apr. 11, 2018).
Cao, Y., et al., "Potential of Quantum Computing for Drug Discovery," IBM Journal of Research and Development, vol. 62, Issue 6, pp. 6:1-6:20, (Dec. 2018).
Cao, Y., et al., "Quantum Chemistry in the Age of Quantum Computing", Quantum Physics, arXiv:1812.09976v2, pp. 1-194 (Dec. 28, 2018).
Cao, Y., et al., "Quantum Neuron: an elementary building block for machine learning on quantum computers", arXiv:1711.11240v1, pp. 1-30 (2017).
Cerezo, M., et al., "Cost function-dependent barren plateaus in shallow quantum neural networks," arXiv preprint arXiv:2001.00550, pp. 1-39 (Mar. 20, 2021).
Cervera-Lierta, A., et al., "The meta-variational quantum eigensolver (meta-vqe): Learning energy profiles of parameterized hamiltonians for quantum simulation," arXiv:2009.13545, pp. 1-11 (May 28, 2021).
Chakraborty, S., et al., "The Power of Blockencoded Matrix Powers: Improved Regression Techniques via Faster Hamiltonian Simulation," arXiv preprint arXiv:1804.01973, pp. 1-58 (Sep. 3, 2018).
Chen, H., et al., "Universal discriminative quantum neural networks", arXiv preprint arXiv:1805.08654v1, pp. 1-19 (May 22, 2018).
Childs, A. M. et al., "Hamiltonian simulation using linear combinations of unitary operations", Quantum Information and Computation, vol. 12, pp. 901-924 (2012).
Childs, A. M., et al., "Quantum algorithm for systems of linear equations with exponentially improved dependence on precision", arXiv:1511.02306v2, pp. 1-31 (2017).
Chiles, R.A., et al., "An electron pair operator approach to coupled cluster wave functions. application to He2, Be2, and Mg2 and comparison with CEPA methods", The Journal of Chemical Physics, vol. 74, No. 8, pp. 4544-4556 (1981).
Cirq, https://github.com/quantumlib/Cirq, Available online, copyright 2019, 2 pages.
Colless, J.I., et al., "Computation of Molecular Spectra on a Quantum Processor with an Error-Resilient Algorithm", Physical Review X, vol. 8, No. 1, pp. 011021-011027 (2018).
Colless, J.I., et al., "Robust determination of molecular spectra on a quantum processor," arxiv.org. Cornell University Library, 201 Olin Library Cornell University Ithaca, NY 14853, XP081278642, DOI: 10.1103/physrevx.8.011021, pp. 1-12 (Jul. 20, 2017).
Cramer, M., et al., "Efficient Quantum State Tomography", Nature communications, 1(149), pp. 1-7 (Dec. 21, 2010).
Crawford, O., et al., "Efficient quantum measurement of Pauli operators in the presence of finite sampling error", Quantum Physics, arXiv:1908.06942v2, pp. 1-17 (Apr. 21, 2020).
Creswell, A., et al., "Generative Adversarial Networks: An Overview", IEEE Signal Processing Magazine, vol. 35, No. 1, pp. 1-14 (2017).
Crooks, G.E., "Performance of the quantum approximate optimization algorithm on the maximum cut problem," arXiv preprint arXiv:1811.08419, pp. 1-6 (2018).
Cubitt, T., and Montanaro, A., "Complexity Classification of Local Hamiltonian Problems", 2014 IEEE 55th Annual Symposium on Foundations of Computer Science, p. 3 (2014) (Abstract).
D'Alessio, L., et al., "From quantum chaos and eigenstate thermalization to statistical mechanics and thermodynamics", Advances in Physics, vol. 65, No. 3, pp. 1-130 (2016).
Dallaire-Demers, P. L., et al., "An application benchmark for fermionic quantum simulations", arXiv:2003.01862v1, pp. 1-14 (Mar. 4, 2020).
Dallaire-Demers, P.L., and Killoran, N., "Quantum generative adversarial networks", arXiv:1804.08641v2, Phys. Rev. A, vol. 98, 012324, pp. 1-10 (Apr. 30, 2018).
Dallaire-Demers, P.L., et al., "Low-depth circuit ansatz for preparing correlated fermionic states on a quantum computer", Quantum Physics, arXiv:1801.01053v1 , pp. 1-15 (Jan. 3, 2018).
Dallaire-Demers, P.L., et al., "Quantum Generative Adversarial Networks," Physical Review A, vol. 98, No. 1, p. 012324, pp. 1-10 (Apr. 30, 2018).
Dallaire-Demers, P.L., et al., "Quantum Generative Adversarial Networks", Quantum Physics, Apr. 30, 2018, pp. 1-10.
Dankert, C., et al., "Exact and approximate unitary 2-designs and their application to fidelity estimation", Physical Review A, vol. 80, No. 1, 012304, pp. 1-7 (Jul. 2009).
Decision of Grant mailed Jan. 20, 2022, in Taiwan patent application No. 109137856, 5 pages.
Decision to Grant mailed Jan. 17, 2023, in Japanese patent application No. 2021-571623, 5 pages.
Decision to Grant mailed Jul. 19, 2022, in Taiwan patent application No. 109139876, 5 pages.
Deutsch, J.M., "Quantum statistical mechanics in a closed system", Phys. Rev. A, vol. 43, No. 4, pp. 2046-2049 (Feb. 15, 1991).
Du, Y., et al., "The Expressive Power of Parameterized Quantum Circuits", arXiv preprint arXiv:1810.11922V1, pp. 1-15 (2018).
Dumitrescu, E., et al., "Tensor Network Benchmarking for Quantum Computing", Beyond CMOS Computing Workshop: The Interconnect Challenge, Session 1, Talk 4, pp. 1-25 (2017).
Dyakonov, M., "The case against Quantum Computing", IEEE Spectrum, pp. 1-5 (Nov. 15, 2018).
Eddins, A., et al., "Doubling the Size of Quantum Simulators by Entanglement Forging," Quantum Physics, arXiv:2104.10220, pp. 1-17 (Apr. 20, 2021).
Endo, S., et al., "Hybrid quantum-classical algorithms and quantum error mitigation," arXiv.2011.01382v1, pp. 1-39 (Nov. 2, 2020) Available online at [https://arxiv.org/abs/2011.01382].
Endo, S., et al., "Hybrid Quantum-Classical Algorithms and Quantum Error Mitigation," Journal of the Physical Society of Japan 90, pp. 1-33 (Feb. 1, 2021).

(56) References Cited

OTHER PUBLICATIONS

Endo, S., et al., "Practical Quantum Error Mitigation for Near-Future Applications", Phys. Rev. X, vol. 8, 031027-1-031027-21 (2018).
Endo, S., et al., "Variational quantum algorithms for discovering Hamiltonian spectra", Physical Review A, arXiv preprint arXiv:1806.05707, pp. 1-9 (2018).
Essler, F. H. L., et al., "The one-dimensional Hubbard model", Cambridge University Press, pp. 1-753 (Dec. 11, 2003).
Esslinger, T., "Fermi-Hubbard physics with atoms in an optical lattice", arXiv:1007.0012v1, pp. 1-29 (Jun. 30, 2010).
Examination Report mailed Aug. 24, 2022, in Canadian patent application No. 3,155,085, 4 pages.
Examination Report mailed Dec. 22, 2021, in Canadian patent application No. 3,133,917, 5 pages.
Extended European Search Report mailed Dec. 22, 2022, in European patent application No. 20890215.5, 10 pages.
Mckinsey & Company, "Quantum Technology Monitor", pp. 1-53 (Jun. 2022).
Meir, Y., and Wingreen, N.S., "Landauer formula for the current through an interacting electron region," Physical review letters, vol. 68, No. 16, pp. 2512-2516, (Apr. 20, 1992).
Mescheder, L., et al., "Which Training Methods for GANs do actually Converge?", International Conference on Machine Learning, pp. 1-39 (2018).
Michielsen, K., et al., "Benchmarking gate-based quantum computers", Quantum Physics, arXiv:1706.04341, vol. 220 pp. 1-33 (Jun. 14, 2017).
Mitarai, K., et al., "Quantum Circuit Learning", Phys. Rev. A 98, 032309, DOI:10.1103/PhysRevA.98.032309, arXiv:1803.00745 [quant-ph], pp. 1-7 (2019).
Moll, N., et al., "Quantum optimization using variational algorithms on near-term quantum devices," Quantum Science and Technology, vol. 3, pp. 18 (Jun. 19, 2018) [retrieved on Nov. 25, 2019]. Retrieved from <https://iopscience.iop.org/article/10.1088/2058-9565/aab822/pdf>.
Mølmer, K., and Sørensen, A., "Multiparticle entanglement of hot trapped ions", arXiv:quant-ph/9810040v2, pp. 1-4 (Jan. 26, 1999).
Mostafa H., and Wang X., et al., "Parameter Efficient Training of Deep Convolutional Neural Networks by Dynamic Sparse Reparameterization", arXiv:1902.05967v3, pp. 1-18 (May 13, 2019).
Motta, M., et al., "Determining eigenstates and thermal states on a quantum computer using quantum imaginary time evolution," Nature Physics, vol. 16, No. 2, pp. 1-18 (Feb. 16, 2020).
Motta, M., et al., "Low rank representations for quantum simulation of electronic structure", Computational Physics, Quantum Physics, arXiv:1808.02625v2, pp. 1-8 (Aug. 9, 2018).
Nakanishi, K.M., et al., "Subspace-search variational quantum eigensolver for excited states," Phys. Rev. Research 1, p. 033062. doi:10.1103/PhysRevResearch.1.033062-1-7 (Oct. 3, 2019).
Nelder, J. A., and Mead, R., "A simplex method for function minimization", The Computer Journal, vol. 7, Issue. 4, pp. 308-313 (Jan. 1965).
Nichol, A., et al., "On first-order metal-earning algorithms," arXiv:1803.02999, pp. 1-15 (Oct. 22, 2018).
Nielsen, M. A., and Chuang, I. L., "Quantum Computation and Quantum Information", Cambridge University Press, pp. 1-704 (2000).
Nielsen, M.A., et al., "Quantum Computation as Geometry", arXiv:quant-ph/0603161v2, pp. 1-13 (Mar. 21, 2006).
Niemann, P., et al., "Logic Synthesis for Quantum State Generation", 2016 IEEE 46th International Symposium on Multiple-Valued Logic (ISMVL), Sapporo, pp. 247-252 (2016).
Niu, M.Y., et al., "Learnability and Complexity of Quantum Samples," arXiv:2010.11983v1. Available at URL <https://arxiv.org/pdf/2010.11983.pdf>, pp. 1-19 (Oct. 22, 2020).
Non-Final Office Action mailed Aug. 3, 2022, in U.S. Appl. No. 16/900,947 of Guoming Wang, filed Jun. 14, 2020, 82 pages.
Non-Final Office Action mailed Dec. 6, 2022, in U.S. Appl. No. 16/543,165 of Peter D. Johnson, filed Aug. 16, 2019, 23 pages.
Non-Final Office Action mailed Dec. 8, 2022 for U.S. Appl. No. 16/740,177, of Maxwell D. Radin, filed Jan. 10, 2020, 85 pages.
Non-Final Office Action mailed Dec. 24, 2021, in U.S. Appl. No. 17/174,900 of Yudong Cao, filed Feb. 12, 2021, 27 pages.
Non-Final Office Action mailed Jun. 10, 2021, in U.S. Appl. No. 17/084,990 of Sukin Sim, filed Oct. 30, 2020, 20 pages.
Non-Final Office Action mailed May 11, 2022, in U.S. Appl. No. 16/543,165 of Peter D. Johnson, filed Aug. 16, 2019, 26 pages.
Non-Final Office Action mailed May 17, 2022, in U.S. Appl. No. 16/662,895 of Eric R. Anschuetz, filed Oct. 24, 2019, 29 pages.
Non-Final Office Action mailed Oct. 14, 2022 for U.S. Appl. No. 16/600,312, of Jhonathan Romero, filed Oct. 11, 2019, pp. 61.
Notice of Allowance mailed Apr. 15, 2022, for U.S. Appl. No. 17/174,900 of Yudong Cao, filed Feb. 12, 2021, 10 pages.
Notice of Allowance mailed Aug. 12, 2021, in U.S. Appl. No. 17/084,990 of Sukin Sim, filed Oct. 30, 2020, 5 pages.
Notice of Allowance mailed Aug. 27, 2021, in U.S. Appl. No. 17/084,990 of Sukin Sim, filed Oct. 30, 2020, 5 pages.
Notice of Allowance mailed Dec. 22, 2022, in U.S. Appl. No. 16/900,947 of Guoming Wang, filed Jun. 14, 2020, 32 pages.
Notice of Allowance mailed Jan. 13, 2023 for U.S. Appl. No. 16/600,312, of Jhonathan Romero, filed Oct. 11, 2019, pp. 21.
Notice of Allowance mailed Jan. 19, 2023, in Canadian patent application No. 3,133,917, 1 page.
Notice of Allowance mailed Jun. 28, 2021, for U.S. Appl. No. 17/033,727 of Pierre-Luc Dallaire-Demers, filed Sep. 26, 2020, 32 pages.
Notice of Allowance mailed Mar. 30, 2023, in Canadian patent application No. 3,155,085, 1 page.
Notice of Allowance mailed May 18, 2022, in Canadian patent application No. 3,151,055, 1 page.
Notice of Allowance mailed Nov. 4, 2022, in U.S. Appl. No. 16/662,895 of Eric R. Anschuetz, filed Oct. 24, 2019, 51 pages.
O'Brien, T. E., et al., "Calculating energy derivatives for quantum chemistry on a quantum computer," NPJ Quantum Information, vol. 5, No. 1, pp. 1-12 (2019).
O'Gorman, B., et al., Generalized swap networks for near-term quantum computing, arXiv: 1905.05118 [quant-ph]., pp. 1-16 (May 13, 2019).
Official Action mailed Sep. 29, 2022, in Canadian patent application No. 3,157,270, 5 pages.
Panahi, A., et al., "word2ket: Space-efficient Word Embeddings inspired by Quantum Entanglement," International Conference on Learning Representations 2020, arXiv:1911.04975, pp. 1-10 (Mar. 3, 2020).
Parrish, R.M., et al., "Quantum Computation of Electronic Transitions Using a Variational Quantum Eigensolver," Physical Review Letters, vol. 122, No. 23, pp. 1-13 (Apr. 10, 2019).
Paszke, A., et al., "Automatic differentiation in PyTorch", 31st Conference on Neural Information Processing Systems Long Beach, CA, USA, pp. 1-4 (NIPS 2017).
Perdomo-Ortiz, A., et al., "Opportunities and challenges for quantum-assisted machine learning in near-term quantum computers", Quantum Science and Technology, vol. 3, No. 3, pp. 1-14 (2018).
Peruzzo, A., et al., "A variational eigenvalue solver on a photonic quantum processor", Nature Communications, vol. 5, Article No. 4213, pp. 1-7 (2014).
Peruzzo, A., et al., "A variational eigenvalue solver on a quantum processor", Quantum Physics, arXiv:1304.3061v1, pp. 1-10 (Apr. 10, 2013).
Pino, J.M., et al., "Demonstration of the QCCD trapped-ion quantum computer architecture", arXiv:2003.01293, pp. 1-11 (Sep. 26, 2020).
Potthoff, M., "Chapter 1: Self-energy-functional theory", arXiv:1108.2183, pp. 1-38 (Aug. 10, 2011).
Poulin, D., and Wocjan, P., "Preparing ground states of quantum many-body systems on a quantum computer," Physical review letters, vol. 102, No. 13, 130503, pp. 1-7 (Sep. 16, 2008).
Powell, M. J. D., "A Direct Search Optimization Method That Models the Objective and Constraint Functions by Linear Interpolation", In: Gomez S., Hennart JP. (eds) Advances in Optimization and Numerical Analysis. Mathematics and Its Applications, vol. 275. Springer, Dordrecht, pp. 51-52 (1994).

(56) References Cited

OTHER PUBLICATIONS

Pranav Gokhale et al., "Partial Compilation of Variational Algorithms for Noisy Intermediate-Scale Quantum Machines," Micro-52, Oct. 12-16, 2019, Columbus, OH, USA, 13 pages. XP 58476958A. Available online at <https://doi.org/10.1145.3352460.3358313>.
Preskill, J., "Quantum Computing in the NISQ era and beyond", Jul. 31, 2018, pp. 1-20.
He, K., et al., "Deep Residual Learning for Image Recognition", Proceedings of the IEEE conference on computer vision and pattern recognition, pp. 770-778 (2016).
He, M., et al., "Quantum Gaussian filter for exploring ground-state properties," arXiv preprint arXiv:2112.06026, pp. 1-7 (Dec. 11, 2021).
He, Z., et al., "A Conditional Generative Model Based on Quantum Circuit and Classical Optimization", International Journal of Theoretical Physics, vol. 58, pp. 1138-1149 (2019).
Helgaker T. et al., "Molecular Electronic-Structure Theory", Book published by John Wiley & Sons, pp. 1-908 (2000).
Hempel, C. et al., "Quantum chemistry calculations on a trapped-ion quantum simulator," arxiv.org. Cornell University Library, 201 Olin Library Cornell University Ithaca, NY 14853, XP080859698, pp. 1-21 (Mar. 27, 2018).
Heya, K., et al., "Variational Quantum Gate Optimization", Quantum Physics, arXiv:1810.12745v1, pp. 1-10 (Oct. 30, 2018).
Higgott, O., et al., "Variational Quantum Computation of Excited States," Quantum, vol. 3, pp. 1-11 (Jun. 28, 2019).
Horgan, J., "Will Quantum Computing Ever Live up to Its Hype?", Quantum Computing, Scientific American, pp. 6 (Apr. 20, 2021).
Hospedales. T., et al., "Meta-Learning in Neural Networks: A Survey," arXiv e-prints , arXiv:2004.05439, pp. 1-20 (Nov. 7, 2020).
Hoyer, P., et al., "On Arbitrary Phases in Quantum Amplitude Amplification", arXiv:quant-ph/0006031v1, pp. 1-6 (Jun. 7, 2000).
Huang, C., et al., "Classical Simulation of Quantum Supremacy Circuits," arXiv:2005.06787v1., pp. 1-28 (May 14, 2020) Available online at [https://arxiv.org/abs/2005.06787].
Huang, H., et al., "Near-term quantum algorithms for linear systems of equations," arXiv preprint arXiv:1909.07344, pp. 1-22 (Dec. 16, 2019).
Huggins, W. J., et al., "Efficient and noise resilient measurements for quantum chemistry on near-term quantum computers", Quantum Physics, arXiv:1907.13117v3, pp. 1-10 (Sep. 23, 2019).
Huggins, W., et al., "Towards quantum machine learning with tensor networks", Quantum Science and Technology, arXiv:1803.1153v2, vol. 4, No. 2, pp. 1-12 (Jul. 31, 2018).
International Search Report & Written Opinion mailed Dec. 11, 2020, in international patent application No. PCT/US2020/049605, 14 pages.
International Search Report & Written Opinion mailed Feb. 18, 2021, in international patent application No. PCT/US2020/058119, 7 pages.
International Search Report & Written Opinion mailed Jan. 14, 2022, in international patent application No. PCT/US2021/024308, 7 pages.
International Search Report & Written Opinion mailed Jan. 5, 2021, in international patent application No. PCT/US2020/052958, 7 pages.
International Search Report & Written Opinion mailed Jul. 27, 2020, in international patent application No. PCT/US2020/028670, 7 pages.
International Search Report & Written Opinion mailed Jun. 15, 2022, in international patent application No. PCT/US2022/018727, 9 pages.
International Search Report & Written Opinion mailed Jun. 28, 2022, in international patent application No. PCT/US2022/019724, 9 pages.
International Search Report & Written Opinion mailed Mar. 29, 2022, in international patent application No. PCT/US2022/012227, 6 pages.
International Search Report & Written Opinion mailed May 11, 2020, in International Patent Application No. PCT/US2020/013181, 11 pages.
International Search Report & Written Opinion mailed Nov. 6, 2020, in international patent application No. PCT/US2020/044615, 8 pages.
International Search Report & Written Opinion mailed Sep. 6, 2021, in international patent application PCT/US2021/033089, 8 pages.
International Search Report and Written Opinion mailed Dec. 6, 2019 in PCT International Patent Application No. PCT/US2019/046895, 9 pages.
International Search Report and Written Opinion mailed Feb. 10, 2020 in International patent application No. PCT/US2019/057893, 7 pages.
International Search Report and Written Opinion mailed Feb. 4, 2020, in International Patent Application No. PCT/US2019/055970, 11 pages.
International Search Report and Written Opinion mailed Feb. 4, 2022, in International Patent Application No. PCT/US2021/055867, 6 pages.
International Search Report and Written Opinion mailed Jan. 5, 2023, in international patent application No. PCT/US2022/043793, 8 pages.
International Search Report and Written Opinion mailed Jun. 7, 2021, in international patent application No. PCT/US2021/017863, 7 pages.
International Search Report and Written Opinion mailed Mar. 15, 2021, in International Patent Application No. PCT/US2020/061631, 7 pages.
International Search Report and Written Opinion mailed Sep. 21, 2020, in international patent application No. PCT/US2020/037655, pp. 1-8.
International Search Report and Written Opinion mailed Sep. 29, 2022, in PCT patent application No. PCT/US2021/062191, 8 pages.
Izmaylov, A. F., et al., "Unitary Partitioning Approach to the Measurement Problem in the Variational Quantum Eigensolver Method", Quantum Physics, arXiv:1907.09040v2, pp. 1-7 (Oct. 18, 2019).
Jansen, K., and Hartung, T., "Zeta-regularized vacuum expectation values from quantum computing simulations," arXiv:1912.01276v1. pp 1-14. (Dec. 3, 2019) [retrieved on Jan. 3, 2023]. Retrieved from <URL: https://arxiv.org/pdf/1912.01276.pdf>.
Johnson, P.D., et al., "QVector: an algorithm for device-tailored quantum error correction", arXiv preprint arXiv:1711.02249v1, pp. 1-16 (Nov. 7, 2017).
Johnson, P.D., et al., "QVector: an algorithm for device-tailored quantum error correction," pp. 1-16, XP055553548, (Nov. 7, 2017) Retrieved from the Internet at <URL:https://arxiv.org/pdf/1711.02249.pdf.
Johnson, P.D., et al., "A Method for Improving Quantum Optimization Algorithms: The Marginals Optimization Procedure", Ice 5th Conference on Quantum Information, Spain, (May 28-31, 2019), Book of Abstracts p. 59.
Jones T., and Benjamin S. C., et al., "Quantum compilation and circuit optimisation via energy dissipation", arXiv:1811.03147, pp. 1-13 (Dec. 19, 2018).
Jordan, P., et al., "In The Collected Works of Eugene Paul Wigner: Part A: The Scientific Papers—Chapter: Über das Paulische Äquivalenzverbot", pp. 109-129. Springer (1993).
Kadurin, A., et al., "druGAN: An Advanced Generative Adversarial Autoencoder Model for de Novo Generation of New Molecules with Desired Molecular Properties in Silico," Molecular Pharmaceutics 2017, vol. 14, 9, pp. 3098-3104 (Jul. 13, 2017) (Abstract).
Kandala, A., et al., "Hardware-efficient variational quantum eigensolver for small molecules and quantum magnets", Nature 549, pp. 1-24 (Oct. 13, 2017).
Kandala, A., et al., "Extending the computational reach of a noisy superconducting quantum processor", arXiv preprint arXiv:1805.04492v1, pp. 1-10 (2018).
Kandala, A., et al., "Hardware-efficient Variational Quantum Eigensolver for Small Molecules and Quantum Magnets", Nature, vol. 549, pp. 1-24 (2017).

(56) References Cited

OTHER PUBLICATIONS

Kaneko, T., and Harada, T., "Noise Robust Generative Adversarial Networks", Cornell University, Available online at [https://arxiv.org/abs/1911.11776v1], Nov. 26, 2019, pp. 1-29.
Kassal, I., et al., "Polynomial-time quantum algorithm for the simulation of chemical dynamics," Proceedings of the National Academy of Sciences, vol. 105, No. 48, pp. 1-6 (2008).
Kaufman, A.M., et al., "Quantum thermalization through entanglement in an isolated many-body system", Science, vol. 353, No. 6301, Aug. 19, 2016, pp. 794-800.
Kaushal, V., et al., "Shuttling-based trapped-ion quantum information processing", AVS Quantum Science, vol. 2, No. 1, pp. 1-25 (2020).
Kiefer, J., et al., "Stochastic Estimation of the Maximum of a Regression Function", Ann. Math. Statist. vol. 23, No. 3. pp. 462-466 (1952).
Official Action mailed May 16, 2023, in Canadian patent application No. 3,157,270, 4 pages.
Kieferova, M., et al, "Tomography and generative training with quantum Boltzmann machines", Phys. Rev. A, vol. 96, No. 6. 062327, pp. 1-2 (Dec. 22, 2017).
Kingma, D.P., and Ba, J.L., "Adam: A method for stochastic optimization," arXiv preprint arXiv:1412.6980, pp. 1-15 (2014).
Kirby, W.M., and Love, P.J., "Classical simulation of noncontextual Pauli Hamiltonians," Physical Review A, vol. 102, No. 3, pp. 1-15 (Sep. 24, 2020).
Kirby, W.M., et al., "Contextual Subspace Variational Quantum Eigensolver," Quantum, vol. 5, pp. 1-18 (May 12, 2021).
Kirby, W.M., et al., "Contextuality Test of the Nonclassicality of Variational Quantum Eigensolvers," Physical review etters, vol. 123, No. 20, pp. 1-14 (Feb. 7, 2020).
Kitaev, A.Y., "Quantum Measurements and the Abelian Stabilizer Problem", arXiv preprint quant-ph/9511026, pp. 1-22 (Nov. 20, 1995).
Kitaev, A.Y., et al., "Classical and quantum computation," Graduate Studies in Mathematics, vol. 47, 2002, 24 pages. Editorial Committee: Steven G. Krantz, David Saltman, David Sattinger and Ronald Stern, American Mathematical Society; Providence, Rhode Island, United States of America.
Kivlichan, I. D., et al., "Quantum Simulation of Electronic Structure with Linear Depth and Connectivity", Phys. Rev. Lett. 120, arXiv:1711.04789v2, pp. 1-6 (Mar. 13, 2018).
Kjaergaard, M., et al., "Superconducting Qubits: Current State of Play", arXiv:1905.13641v2, pp. 1-28 (Jul. 26, 2019).
Knill, E., et al., "Optimal Quantum Measurements of Expectation Values of Observables," Physical Review A, 7(1), , p. 012328, pp. 1-22 (Jul. 3, 2006).
Knill, E., et al., "Optimal Quantum Measurements of Expectation Values of Observables", arXiv quant-ph/0607019v1, pp. 1-22 (Jul. 3, 2006).
Kottmann, J.S., et al., "Reducing qubit requirements while maintaining numerical precision for the variational quantum eigensolver: A basis-set-free approach," The Journal of Physical Chemistry Letters 12.1, arXiv:2008.02819, pp. 663-673 (2021).
Kottmann, J.S., et al., "Reducing Qubit Requirements while Maintaining Numerical Precision for the Variational Quantum Eigensolver: A Basis-Set-Free Approach," The Journal of Physical Chemistry Letters, vol. 12, No. 1, pp. 1-13 (Dec. 31, 2020).
Krantz, P., et al., "A Quantum Engineer's Guide to Superconducting Qubits", Applied Physics Reviews, vol. 6, No. 2, 021318, pp. 1-59 (2019).
Kühn, M., et al., "Accuracy and Resource Estimations for Quantum Chemistry on a Near-Term Quantum Computer," Journal of Chemical Theory and Computation 15.9, pp. 1-26. arXiv:1812.06814 (Aug. 14, 2019).
Kyriienko, O., "Quantum inverse iteration algorithm for programmable quantum simulators," arXiv preprint arXiv:1901.09988, pp. 1-16 (Sep. 30, 2019).
Lee, S.J.R., et al., "Analytical Gradients for Projection-Based Wavefunction-in-DFT Embedding", arXiv:1903.05830v3, pp. 1-15 (Aug. 19, 2019).
Lemke, C., et al., "Metalearning: a survey of trends and technologies," Artificial Intelligence Review 44, 117 pp. 1-17 (2015).
Li, Z., et al., "Meta-sgd: Learning to learn quickly for few-shot learning," arXiv preprint arXiv:1707.09835, pp. 1-11 (Sep. 28, 2017).
Lieb, E.H., and Wu,F.Y., "The one-dimensional Hubbard model: a reminiscence," Physica A: Statistical Mechanics and its Applications 321, 1, arXiv:0207529, pp. 1-33 (2002).
Lin, L, and Tong, Y., "Heisenberg-limited ground state energy estimation for early fault-tolerant quantum computers," arXiv preprint arXiv:2102.11340, pp. 1-24 (Feb. 22, 2021).
Lin, L, and Tong, Y., "Near-optimal ground state preparation," Quantum, 4:372,arXiv:2002.12508, pp. 1-22 (Dec. 6, 2020).
Liu, J., and Wang, L., "Differentiable learning of quantum circuit Born machines", Phys. Rev. A 98, 062324, pp. 1-9 (2018).
Liu, Y., "The Complexity of the Consistency and N-Representability Problems for Quantum States", Quantum Physics, arXiv preprint arXiv:0712.3041, pp. 1-89 (2007).
Liu, Y., et al., "Quantum computational complexity of the N-representability problem: QMA complete", Physical review letters, vol. 98, No. 11, pp. 1-6 (2007).
Liu, Z., et al., "Some ground-state expectation values for the free parafermion Z(N) spin chain," arXiv:1905.08384v3. pp. 1-17 (Oct. 14, 2019) [retrieved on Jan. 3, 2023]. Retrieved from <URL: https://arxiv.org/pdf/1905.08384.pdf>.
Lloyd, S., "Universal Quantum Simulators", Science, vol. 273, No. 5278, pp. 1073-1078 (Aug. 23, 1996).
Lloyd, S., and Weedbrook, C., "Quantum Generative Adversarial Learning", Phys. Rev. Lett. vol. 121, No. 4, pp. 040502-1-040502-5 (2018).
Lloyd, S., et al., "Quantum embeddings for machine learning," https://arxiv.org/abs/2001.03622, pp. 1-11 (Feb. 10, 2020).
Long, G.L., et al., "Phase Matching in Quantum Searching", arXiv:quant-ph/9906020v1, pp. 1-13 (Jun. 5, 1999).
Low, G.H., and Chuang, I.L., "Optimal Hamiltonian Simulation by Quantum Signal Processing", arXiv:1606.02685v2, pp. 1-6 (Dec. 20, 2016).
Low, G.H., et al., "Methodology of Resonant Equiangular Composite Quantum Gates", Physical Review X, vol. 6, No. 4, pp. 1-13 (2016).
M Mohseni et al., "Quantum Process Tomography: Resource Analysis of Different Strategies," arxiv.org, Cornell University Library, 201 Olin Library Cornell University Ithaca, NY 14853, Feb. 13, 2007, XP080275525, DOI: 10.1103/PHYSREVA.77.032322, 10 pages.
M. Plesch, M., and Brukner, C., "Quantum-State Preparation with Universal Gate Decompositions", Phys. Rev. A 83, arXiv:1003.5760v2, 032302, pp. 1-5 (Mar. 4, 2011).
Majumder, S., et al., "Real-time calibration with spectator qubits", npj Quantum Information, vol. 6, Retrieved from: <URL: https://www.nature.com/articles/s41534-020-0251-y>, pp. 1-9 (Feb. 7, 2020).
Manby, F.R., et al., "A simple, exact density-functional-theory embedding scheme", Journal of Chemical Theory and Computation, 8 (8), pp. 2564-2568 (Jul. 17, 2012).
Mandra, S., et al., "Strengths and weaknesses of weak-strong cluster problems: A detailed overview of state-of-the-art classical heuristics versus quantum approaches", Phys. Rev. A, vol. 94, No. 6, 022337, pp. 1-14 (Aug. 29, 2016).
Manrique, D.Z., et al., "Momentum-Space Unitary Coupled Cluster and Translational Quantum Subspace Expansion for Periodic Systems on Quantum Computers," arXiv:2008.08694 [quant-ph], pp. 1-31 (2021).
Mari, A., et al., "Estimating the gradient and higher-order derivatives on quantum hardware," Phys. Rev. A 103, 012405, pp. 1-17 (Feb. 26, 2021).
Maslov, D., "Basic Circuit Compilation Techniques for an Ion-Trap Quantum Machine", https://arxiv.org/pdf/1603.07678v4, pp. 1-18 (Feb. 21, 2017).

(56) References Cited

OTHER PUBLICATIONS

Mcardle, S., et al., "Quantum computational chemistry," arxiv.org, Cornell University Library, 201 Olin Library Cornell University Ithaca, NY 14853, pp. 1-59 XP081585393 (Aug. 30, 2018).
Mcardle, S., et al., "Digital quantum simulation of molecular vibrations," Chemical science, 10(22):5725-5735, 2019, arXiv:1811.04069, pp. 1-14 (Jan. 23, 2020).
Mcardle, S., et al., "Variational ansatz-based quantum simulation of imaginary time evolution," Nature Partner Journals: Quantum Information, vol. 5, No. 1, pp. 1-6 (2019).
Mcclean, J. R., et al., "Barren plateaus in quantum neural network training landscapes", Nature Communications, vol. 9, pp. 1-6, (2018).
Mcclean, J. R., et al., "The theory of variational hybrid quantum-classical algorithms", New Journal of Physics, vol. 18, pp. 1-22 (Feb. 5, 2016).
McClean, J.R., et al., "Barren plateaus in quantum neural network training landscapes," Nature communications, arXiv:1803.11173, pp. 1-6 (2018).
Mcclean, J.R., et al., "Decoding quantum errors with subspace expansions," Nat. Comm. 11, p. 636. doi: 10.1038/s41467-020-14341—pp. 1-9 (2020).
Mcclean, J.R., et al., "Hybrid Quantum-Classical Hierarchy for Mitigation of Decoherence and Determination of Excited States", Physical Review A, vol. 95, No. 4, pp. 1-10 (2017).
Mcclean, J.R., et al., "OpenFermion: the electronic structure package for quantum computers", Quantum Science and Technology 5.3, p. 034014, pp. 1-22 (2020).
Mcclean, J.R., et al., "The theory of variational hybrid quantum-classical algorithms," New Journal of Physics, vol. 18, No. 2, arXiv:1509.04279, pp. 1-20 (Sep. 14, 2015).
Steiger, D.S., et al., "Advantages of a modular high-level quantum programming framework," arXiv:1806.01861, pp. 1-11 (Jun. 5, 2018).
Subasi, Y., et al., "Quantum algorithms for systems of linear equations inspired by adiabatic quantum computing," Physical review letters, vol. 122, No. 6, pp. 1-9 (Nov. 29, 2018).
Szabo, A. and Ostlund, N.S., "Modern quantum chemistry: introduction to advanced electronic structure theory," Courier Corporation, 2012. pp. 1-479 (2012).
Takeshita, T., et al., "Increasing the Representation Accuracy of Quantum Simulations of Chemistry without Extra Quantum Resources," Phys. Rev. X, vol. 10, No. 1, pp. 1-9 (Jan. 7, 2020).
Temme, K., et al., "Error Mitigation for Short-Depth Quantum Circuits", Physical review letters, vol. 119, No. 18, 180509, pp. 1-15 (2017).
Torlai, G., et al., "Neural-Network Quantum State Tomography", Nature Physics, vol. 14, No. 5, pp. 1-6 (Feb. 2018).
Tubman, N. M., et al., "Postponing the Orthogonality Catastrophe: Efficient State Preparation for Electronic Structure Simulations on Quantum Devices," Quantum Physics, arXiv:1809.05523, pp. 1-13, (Sep. 14, 2018).
Urbanek, M., et al., "Chemistry on Quantum Computers with Virtual Quantum Subspace Expansion," Journal of Chemical Theory and Computation 16.9, pp. 5425-5431. doi: 10.1021/acs.jctc.0c00447. (Feb. 28, 2020).
Valiant, L. G., "Quantum computers that Can Be Simulated Classically in Polynomial Time", SIAM Journal on Computing, vol. 31, No. 4, pp. 1-10 (2002).
Verdon, G., et al., "A quantum algorithm to train neural networks using low-depth circuits", Quantum Physics, arXiv:1712.05304 [quant-ph], pp. 1-9 (Dec. 14, 2017).
Verdon, G., et al., "Learning to learn with quantum neural networks via classical neural networks," arXiv:1907.05415, pp. 1-12 (Jul. 11, 2019).
Verdon, G., et al., "Quantum Hamiltonian-Based Models and the Variational Quantum Thermalizer Algorithm," Quantum Physics, arXiv:1910.02071, pp. 1-21 (Oct. 4, 2019).
Verstraete, F., et al., "Quantum Circuits for Strongly Correlated Quantum Systems", arXiv:0804.1888v1, pp. 1-5 (Apr. 11, 2008).
Verteletskyi, V., et al., "Measurement optimization in the variational quantum eigensolver using a minimum clique cover", Quantum Physics, arXiv:1907.03358v4, pp. 1-7 (Mar. 26, 2020).
Wan, K. H., et al., "Quantum generalisation of feedforward neural networks", npj Quantum Information, vol. 3, Article No. 36, arXiv:1612.01045, pp. 1-8 (2017).
Wang, D., et al., "Accelerated Variational Quantum Eigensolver", arXiv:1802.00171v3, pp. 1-11 (Mar. 25, 2019).
Wang, G., et al., "Bayesian Inference with Engineered Likelihood Functions for Robust Amplitude Estimation", arXiv:2006.09350v2, pp. 1-62 (Jun. 26, 2020).
Wang, G., et al., "Minimizing Estimation Runtime on Noisy Quantum Computers," PRX Quantum 2.1 pp. 010346-1-010346-49 (2021).
Watson, J.D., et al., "The complexity of translationally invariant problems beyond ground state energies", arXiv preprint arXiv:2012.12717, pp. 1-58 (Dec. 23, 2020).
Wecker, D., et al., "Solving strongly correlated electron models on a quantum computer", Physical Review A, vol. 92, No. 6, pp. 1-27 (2015).
Wecker, D., et al., "Progress towards practical quantum variational algorithms", Phys. Rev. A 92, 042303, pp. 1-11 (Sep. 8, 2015).
Wecker, D., et al., "Towards Practical Quantum Variational Algorithms", Physical Review A, vol. 92, No. 4, 042303, pp. 1-11 (Sep. 8, 2015).
Wendin, G., "Quantum information processing with superconducting circuits: a review", Reports on Progress in Physics, vol. 80, No. 10, pp. 108 (2017).
Wiebe, N., and Granade, C., "Efficient Bayesian Phase Estimation", arXiv:1508.00869v1, pp. 1-12 (Aug. 4, 2015).
Wiebe, N., et al., "Higher Order Decompositions of Ordered Operator Exponentials", Mathematical Physics, arXiv:0812.0562v3, pp. 1-16 (Dec. 4, 2008).
Willsch, M., et al., "Benchmarking the quantum approximate optimization algorithm," Quantum Information Processing 19, 197, pp. 1-24 (2020).
Wilson, M., et al., "Optimizing quantum heuristics with meta-learning," arXiv:1908.03185, pp. 1-13 (Aug. 8, 2019).
Wootton, J. R., "Benchmarking of quantum processors with random circuits", arXiv: Quantum Physics, arXiv:1806.02736v1, pp. 1-15 (Jun. 7, 2018).
Xia, R., and Kais, S., "Hybrid Quantum-Classical Neural Network for Calculating Ground State Energies of Molecules," Entropy, vol. 22, No. 8, pp. 1-12 (Jul. 29, 2020) Available online at [https://doi.org/10.3390/e22080828].
Yang, S., et al., "Loop Optimization for Tensor Network Renormalization," arXiv:1512.04938v2, Available online at URL <https://arxiv.org/pdf/1512.04938.pdf>, vol. 118, No. 11, pp. 1-15 (Feb. 25, 2017).
Yen, T., et al., "Measuring all Compatible Operators in One Series of Single-Qubit Measurements Using Unitary Transformations," Journal of Chemical Theory and Computation, vol. 16, No. 4, pp. 1-12 (Mar. 14, 2020.) arXiv:1907.09386.
Yoder, T.J., et al., "Fixed-point quantum search with an optimal number of queries," Physical review letters, vol. 113, No. 21, pp. 210501-210505 (Nov. 21, 2014).
You, Y., et al., "Machine learning spatial geometry from entanglement features," Phys. Rev. B 97, 045153, pp. 1-15 (Jan. 31, 2018).
Zeng, J., et al., "Learning and Inference on Generative Adversarial Quantum Circuits", arXiv preprint arXiv:1808.02893, vol. 99, No. 5, pp. 1-7 (2018).
Zeng, J., et al., "Learning and Inference on Generative Adversarial Quantum Circuits", arXiv preprint arXiv:1808.03425v1, pp. 1-7 (2018).
Zhao, A., et al., "Measurement reduction in variational quantum algorithms", Quantum Physics, arXiv:1908.08067v2, pp. 1-21 (Dec. 16, 2019).
Zhao, P., et al., "High-contrast ZZ interaction using superconducting qubits with opposite-sign anharmonicity," arXiv:2002.07560v2, pp. 1-16 (Mar. 27, 2021).
Zhou, L., et al., "Quantum approximate optimization algorithm: Performance, mechanism, and implementation on near-term devices," Phys. Rev. X, vol. 10, pp. 1-23 (2020).

(56) References Cited

OTHER PUBLICATIONS

Zhukov, A. A., et al., "Quantum communication protocols as a benchmark for quantum computers", arXiv:1812.00587v1, pp. 1-25 (Dec. 3, 2018).
Extended European Search Report mailed Dec. 7, 2021, in European patent application 19871859.5, 14 pages.
Extended European Search Report mailed Dec. 7, 2021, in European patent application 19874946.7, 11 pages.
Extended European Search Report mailed Jan. 12, 2023, in European Patent Application No. 20882002.7, 10 pages.
Extended European Search Report mailed Jun. 22, 2022, in European patent application No. 20791186.8, 8 pages.
Extended European Search Report mailed May 19, 2022, in European patent application No. 19850377.3, 10 pages.
Extended European Search Report mailed Oct. 27, 2022, in European patent application No. 20868114.8, 10 pages.
Extended European Search Report mailed Sep. 20, 2022, in European patent application No. 20738886.9, 10 pages.
Farhi, E., and Neven, H., "Classification with Quantum Neural Networks on Near Term Processors", arXiv preprint arXiv:1802.06002v2, pp. 1-21 (Aug. 30, 2018).
Farhi, E., et al., "A quantum approximate optimization algorithm", Quantum Physics, arXiv:1411.4028v1, pp. 1-16 (Nov. 14, 2014).
Fedorov, A., et al., "Implementation of a Toffoli Gate with Superconducting Circuits", arXiv:1108.3966v1, pp. 1-5 (Aug. 19, 2011).
Ferrie, C., et al., "How to Best Sample a Periodic Probability Distribution, or on the Accuracy of Hamiltonian Finding Strategies", Quantum Information Processing, arXiv:1110.3067v1, pp. 1-8 (Oct. 13, 2011).
Figgat, C., et al., "Complete 3-Qubit Grover search on a programmable quantum computer", Nature Communications, vol. 8, Article No. 1918, pp. 1-9 (2017).
Final Office Action mailed Aug. 25, 2022, in U.S. Appl. No. 16/543,165 of Peter D. Johnson, filed Aug. 16, 2019, 73 pages.
Finn, C., and Levine, S., "Meta-learning and universality: Deep representations and gradient descent can approximate any learning algorithm," arXiv:1710.11622, pp. 1-20 (Feb. 14, 2018).
First Examination Report mailed Oct. 28, 2022, in Australian patent application No. 2020292425, 3 pages.
First Office Action mailed Dec. 29, 2022, in Canadian patent application No. 3,141,547, 4 pages.
First Office Action mailed May 14, 2021, in Taiwan patent application No. 109139876, 9 pages (English translation Included).
First Office Action mailed Oct. 8, 2021, in Taiwan patent application No. 109137856, 5 pages.
Frank Jensen, "Introduction to computational chemistry," John Wiley & Sons, Great Britain, 2017, 620 pages.
Gao, N., et al., "High Dimensional Similarity Search with Quantum-Assisted Variational Autoencoder," arXiv:2006.0768v1, Available at URL https://arxiv.org/pdf/2006.07680.pdf, pp. 1-9 (Jun. 13, 2020).
Garcia-Saez, A., et al., "Local Temperature in Quantum Thermal States", vol. 79, No. 5, arXiv: 0808.0102v2, pp. 1-10 (Jun. 2, 2009).
Garcia-Saez, A., et al., "Addressing Hard Classical Problems with Adiabatically Assisted Variational Quantum Eigensolvers", Quantum Physics, arXiv preprint arXiv:1806.02287, pp. 1-7 (2018).
Garrison, J.R., et al., "Does a Single Eigenstate Encode the Full Hamiltonian?" Physical Review X, vol. 8, No. 2, pp. 021026-1-021026-24 (2018).
Ge, Y., et al., "Faster Ground State Preparation and High-Precision Ground Energy Estimation with Fewer Qubits," Journal of Mathematical Physics, vol. 60, No. 2,: arXiv:1712.03193, 1-25 (Feb. 2, 2018).
Gentini, L., et al., "Noise-Assisted Variational Hybrid Quantum-Classical Optimization", arXiv:1912.06744, pp. 1-8 (Dec. 13, 2019).
Ghamami, S., and Zhang, B., et al., "Efficient Monte Carlo Counterparty Credit Risk Pricing and Measurement", Journal of Credit Risk, vol. 10, No. 3, pp. 1-42 (Jul. 23, 2014).
Gharibian, S., et al., "Oracle Complexity Classes and Local Measurements on Physical Hamiltonians," In 37th International Symposium on Theoretical Aspects of Computer Science (STACS 2020). Schloss Dagstuhl-Leibniz-Zentrum für Informatik, 2020. arXiv:1909.05981, pp. 1-38 (Sep. 12, 2019).
Gharibian, S., et al., "The complexity of simulating local measurements on quantum systems," Quantum, 3:189, 2019. arXiv:1606.05626, pp. 1-38 (Apr. 7, 2020).
Gilyén, A., et al., "Quantum Singular Value Transformation and Beyond: Exponential Improvements for Quantum Matrix Arithmetics," In Proceedings of the 51st Annual ACM SIGACT Symposium on Theory of Computing, pp. 193-204, 2019. arXiv:1806.01838, Jun. 5, 2018, 67 pages.
Goemans, M.X., et al., "Improved Approximation Algorithms for Maximum Cut and Satisfiability Problems Using Semidefinite Programming", Journal of the ACM (JACM), vol. 42, No. 6, pp. 1115-1145 (Nov. 1995).
Gokhale, P., and Chong, F.T., "O(N3) Measurement Cost for Variational Quantum Eigensolver on Molecular Hamiltonians", arXiv:1908.11857v1, pp. 1-5 (Aug. 30, 2019).
Gokhale, P., et al., "Minimizing state preparations in variational quantum eigensolver by partitioning into commuting families", Quantum Physics, arXiv:1907.13623v1, pp. 1-23 (Jul. 31, 2019).
Gómez-Bombarelli, R., et al., "Automatic Chemical Design Using a Data-Driven Continuous Representation of Molecules", ACS Cent. Sci., vol. 4, No. 2, pp. 268-276 (2018).
Gonthier, J., et al., "Identifying challenges towards practical quantum advantage through resource estimation: the measurement roadblock in the variational quantum eigensolver," Quantum Physics, arXiv:2012.04001, pp. 1-27 (Dec. 7, 2020).
Goodfellow, I. J., et al., "Generative adversarial nets", in Advances in neural information processing systems, pp. 1-9 (2014).
Goodfellow, I. J., et al., "Generative Adversarial Networks", arXiv:1406.2661v1 [stat.ML], 2014, pp. 1-9 (Jun. 10, 2014).
Goodfellow, I., "NIPS 2016 Tutorial: Generative Adversarial Networks", arXiv preprint arXiv:1701.00160v4, pp. 1-57 (2016).
Goodfellow, I., et al., "Deep Learning", Book, vol. 1 (MIT press Cambridge, 2016) available online at http://www.deeplearningbook.org, pp. 1-798.
Grant, E., et al., "An initialization strategy for addressing barren plateaus in parametrized quantum circuits," Quantum 3, 214, pp. 1-9 (Nov. 28, 2019).
Grant, E., et al., "Hierarchical quantum classifiers", npj Quantum Information, vol. 4, Article No. 65 ISSN 2056-6387, pp. 1-8 (2018).
Gregory, A., and Chiang, C., "Simulation of Quantum Walks via Hamiltonian Reduction", 2018 IEEE Nanotechnology Symposium (Ants), pp. 1 (2018) (Abstract).
Grimsley, H.R., et al., "An adaptive variational algorithm for exact molecular simulations on a quantum computer," Nature Communications 10, 3007, pp. 1-9 (2019).
Grover, L., and Rudolph, T., et al., "Creating superpositions that correspond to efficiently integrable probability distributions", arXiv preprint quantph/0208112v1, pp. 1-2 (2002).
Grover, L.K., "A fast quantum mechanical algorithm for database search," arXiv preprint quant-ph/9605043, pp. 1-8 (May 1996).
Grover, L.K., "A fast quantum mechanical algorithm for database search", STOC '96: Proceedings of the twenty-eighth annual ACM symposium on Theory of Computing, pp. 1-8 (Jul. 1996).
Guimaraes, G., et al., "Objective-Reinforced Generative Adversarial Networks (ORGAN) for Sequence Generation Models", arXiv preprint arXiv:1705.10843v3, pp. 1-7 (2018).
Han, Z., et al., "Unsupervised Generative Modeling Using Matrix Product States," arXiv:1709.01662v3, Available online at URL https://arxiv.org/pdf/1709.01662.pdf, pp. 1-13 (Jul. 19, 2018).
Handy, N.C., et al., "Size-consistent Brueckner theory limited to double substitutions", Chemical Physics Letters, vol. 164, No. 2-3, pp. 185-192 (Dec. 8, 1989).
Harrow, A. W., et al., "Quantum algorithm for linear systems of equations", Phys. Rev. Lett., vol. 103, No. 15, 1-15 (2009).
Havlicek, V., et al., "Supervised learning with quantum enhanced feature spaces", arXiv:1804.11326v2, pp. 1-22 (Jun. 5, 2018).
"Quantum Computing: Progress and Prospects" National Academies of Sciences, Engineering, and Medicine, pp. 1-273 (2019).
A. Shabani et al., "Efficient measurement of quantum dynamics via compressive sensing," arxiv.org, Cornell University Library, 201

(56) References Cited

OTHER PUBLICATIONS

Olin Library Cornell University Ithaca, NY 14853, Oct. 28, 2009, XP080374481, DOI: 10.1103/PHYSREVLETT.106.100401, 9 pages.
Aaronson, S., and Chen, L., "Complexity-Theoretic Foundations of Quantum Supremacy Experiments", arXiv:1612.05903v2, pp. 1-66 (Dec. 26, 2016).
Abadi, M., et al., "TensorFlow: Large-Scale Machine Learning on Heterogeneous Distributed Systems", pp. 1-19 (Preliminary White Paper, Nov. 9, 2015), software available from tensorflow.org, http://tensorflow.org/.
Ackley, D.H., et al., "A Learning Algorithm for Boltzmann Machines", Cognitive Science, vol. 9, No. 1, pp. 147-169 (1985).
Albash, T., et al., "Adiabatic quantum computation," Rev. Mod. Phys. 90, 015002, pp. 1-71 (2018).
Amaro, D., et al., "Filtering variational quantum algorithms for combinatorial optimization," arXiv preprint arXiv:2106.10055, pp. 1-14 (Feb. 10, 2022).
Ambainis, A., "On physical problems that are slightly more difficult than QMA," In 2014 IEEE 29th Conference on Computational Complexity (CCC), pp. 1-12 (2014).
Amin, M.H., et al., "Quantum Boltzmann Machine", Phys. Rev. X 8, 021050 URL:https://arxiv.org/abs/1601.02036, vol. 8, No. 2, Jan. 8, 2016, pp. 1-10.
Amin, M.H., et al., "Quantum Boltzmann Machine", Physical Review X, vol. 8, No. 1, Available online https://journals.aps.org/prx/abstract/10.1103/PhysRevX.8.021050, pp. 021050-1-021050-11 (May 23, 2018).
Andersen, C.K., et al, "Entanglement stabilization using ancilla-based parity detection and real-time feedback in superconducting circuits," npj Quantum Information, vol. 5, No. 1, pp. 1-7 pages, XP055810501, DOI: 10.1038/s41534-019-0185-4 (Dec. 1, 2019).
Andersen, C.K., et al., "Entanglement Stabilization using Parity Detection and Real-Time Feedback in Superconducting Circuits", arXiv:1902.06946v2, pp. 1-12 (Feb. 20, 2019).
Anirban Narayan Chowdhury et al., "Improved implementation of reflection operators", researchgate.net, Mar. 6, 2018, 12 pages. Available online at https://www.researchgate.net/publication/323627065_Improved_implementation_of_reflection_operators.
Anschuetz, E.R., and Cao, Y., "Realizing Quantum Boltzmann Machines Through Eigenstate Thermalization," arXiv preprint, arXiv:1903.01359 [quant-ph], pp. 1-30 (Mar. 4, 2019).
Anschuetz, E.R., and Zanoci, C., "Near-Term Quantum-Classical Associative Adversarial Networks", Phys. Rev. A, URL: https://arxiv.org/abs/1905.13205, vol. 100, No. 5, 052327, pp. 1-11 (2019).
Arute, F., et al., "Quantum supremacy using a programmable superconducting processor", Nature, vol. 574, pp. 505-510 (Oct. 23, 2019).
Aspuru-Guzik, A., et al., "Simulated Quantum Computation of Molecular Energies", Science, Quantum Physics, vol. 309, No. 5741, pp. 1-21 (Sep. 9, 2005).
Aspuru-Guzik, A., et al., "The Matter Simulation (R)evolution", ACS Cent. Sci., 4, 2, pp. 144-152 (2018).
Atia, Y., and Aharonov, D., "Fast-Forwarding of Hamiltonians and Exponentially Precise Measurements," Nature communications, vol. 8, No. 1, pp. 1-9 (Nov. 17, 2017).
Azad, U., and Singh, H., "Quantum Chemistry Calculations using Energy Derivatives on Quantum Computers," arXiv:2106.06463v1. pp. 1-12 (Jun. 10, 2021) [retrieved on Jan. 3, 2023]. Retrieved from <URL: https://arxiv.org/pdf/2106.06463.pdf>.
Babbush, R., et al., "Encoding Electronic Spectra in Quantum Circuits with Linear T Complexity," Physical Review X, vol. 8, No. 4, 041015, pp. 1-39 (Sep. 19, 2018).
Bach, V., et al., "Generalized Hartree-Fock Theory and the Hubbard Model", Journal of Statistical Physics, vol. 76 (1-2):3-89, pp. 1-68 (Nov. 25, 1993).
Bækkegaard, T., et al., "Realization of efficient quantum gates with a superconducting qubit-qutrit circuit," arXiv.org, Cornell University Library, 201 Olin Library Cornell University Ithaca, NY 14853, Feb. 12, 2018, 27 pages, XP081554230, DOI: 10.1038/s41598-019-49657-1.
Baekkegaard, T., et al., "Realization of efficient quantum gates with a superconducting qubit-qutrit circuit", Scientific Reports, vol. 9, Article No. 13389, pp. 1-10 (Sep. 16, 2019).
Baker, J.M., et al., "Decomposing Quantum Generalized Toffoli with an Arbitrary Number of Ancilla", arXiv:1904.01671v1, pp. 1-10 (Apr. 2, 2019).
Balu, R., and Borle, A., "Bayesian Networks based Hybrid Quantum-Classical Machine Learning Approach to Elucidate Gene Regulatory Pathways", arXiv:1901.10557v1, pp. 1-9 (Jan. 23, 2019).
Bao, N., et al., "Universal Quantum Computation by Scattering in the Fermi-Hubbard model", arXiv:1409.3585v2, pp. 1-9 (Sep. 15, 2014).
Barahona, F., "On the computational complexity of Ising spin glass models", Journal of Physics A: Mathematical and General, vol. 15, No. 10, pp. 3241-3253 (1982).
Barenco, A., et al., "Elementary Gates for Quantum Computation", Physical review A, vol. 52, Issue No. 5, pp. 1-31 (Mar. 23, 1995).
Barenco, A., et al., "Elementary Gates for Quantum Computation", arXiv:quant-ph/9503016v1, Mar. 23, 1995, pp. 1-31.
Barkoutsos, P.K., et al., "Quantum Algorithms for Electronic Structure Calculations: Particle-Hole Hamiltonian and Optimized Wave-Function Expansions," Phys. Rev. A 98, 022322, pp. 1-14 (May 11, 2018).
Baydin, A. G., et al., "Automatic Differentiation in Machine Learning: a Survey", Journal of Machine Learning Research, vol. 18, No. 1, pp. 1-43 (2018).
Bedürftig, G., and Frahm, H., "Spectrum of boundary states in the open Hubbard chain", arXiv:cond-mat.9702227v1, pp. 1-14 (Feb. 26, 1997).
Benedetti, M., et al., "Parameterized quantum circuits as machine learning models," arXiv:1906.07682v2, pp. 1-18 (Oct. 10, 2019). Available online at <https://arxiv.org/abs/1906.07682v2>.
Benedetti, M., et al., "A generative modeling approach for benchmarking and training shallow quantum circuits", arXiv preprint arXiv:1801.07686v4, pp. 1-16 (Jun. 2, 2019).
Benedetti, M., et al., "Estimation of effective temperatures in quantum annealers for sampling applications: A case study with possible applications in deep learning", Phys. Rev. A, vol. 94, No. 2, 022308, pp. 1-15 (Aug. 9, 2016).
Benedetti, M., et al., "Quantum-assisted Helmholtz machines: A quantum-classical deep learning framework for industrial datasets in near-term devices", Quantum Physics, ArXiv 1708.09784v3, pp. 1-11 (Mar. 19, 2018).
Bengio, Y., et al., "Greedy layer-wise training of deep networks", NIPS'06: Proceedings of the 19th International Conference on Neural Information Processing Systems, pp. 1-8 (Dec. 2006).
Bergholm, V., et al., "Pennylane: Automatic differentiation of hybrid quantum-classical computations," arXiv preprint arXiv:1811.04968, pp. 1-15 (Feb. 14, 2020).
Bergholm, V., et al., "PennyLane: Automatic differentiation of hybrid quantumclassical computations", arXiv preprint arXiv:1811.04968v3, pp. 1-15 (2018).
Besnier, V., et al., "This Dataset Does Not Exist: Training Models From Generated Images", Available online at [https://arxiv.org/abs/1911.02888, Nov. 7, 2019, pp. 1-6.
Biamonte, J., et al., "Quantum machine learning", Nature 549, pp. 195-292 (2016).
Biamonte, J.D., et al., "Realizable Hamiltonians for universal adiabatic quantum computers", Phys. Rev. A, vol. 78, No. 1, 012352, pp. 1-7 (2008).
Bishop, L., et al., "Quantum Volume", Technical report, IBM T.J. Watson, pp. 1-5 (Mar. 4, 2017).
Bogoljubov, N.N., "A New Method in the Theory of Superconductivity", Soviet Physics JETP, vol. 34, No. 7, pp. 41-46 (Jul. 1958).
Boixo, S., et al., "Characterizing Quantum Supremacy in Near-Term Devices", Nature Physics, vol. 14, pp. 1-23 (Aug. 3, 2016).
Bonet-Monroig, "Comparison of Error mitigation Strategies in a Hydrogen Molecule Quantum Simulation", Master thesis. Leiden University, pp. 1-52 (May 29, 2018).
Bonet-Monroig, X., et al., "Nearly optimal measurement scheduling for partial tomography of quantum states", Quantum Physics, arXiv:1908.05628v2, pp. 1-9 (Sep. 6, 2019).

(56) References Cited

OTHER PUBLICATIONS

Bonet-Monroig, X., et al., "Performance comparison of optimization methods on variational quantum algorithms," arXiv preprint arXiv:2111.13454, pp. 1-12 (Dec. 14, 2021).
Bookatz, A. D., et al., "Error Suppression in Hamiltonian Based Quantum Computation Using Energy Penalties", arXiv:1407.1485v1, pp. 1-26 (Jul. 6, 2014).
Canadian Office Action issued in App. No. CA3,109,643, dated Oct. 26, 2023, 5 pages.
Sankar Das Sarma et al, "Majorana Zero Modes and Topological Quantum Computation", ARXIV:1501.02813, https://arxiv.org/abs/1501.02813, Oct. 27, 2015 (Oct. 27, 2015) 16 pages.

* cited by examiner

QUANTUM COMPUTER WITH IMPROVED QUANTUM OPTIMIZATION BY EXPLOITING MARGINAL DATA

BACKGROUND

Quantum computers promise to solve industry-critical problems which are otherwise unsolvable. Key application areas include chemistry and materials, bioscience and bioinformatics, logistics, and finance. Interest in quantum computing has recently surged, in part, due to a wave of advances in the performance of ready-to-use quantum computers. Although these machines are not yet able to solve useful industry problems, the precipice of utility seems to be rapidly approaching.

In addition to the improvements in the quantum hardware, recent algorithmic developments have created new opportunities for achieving quantum utility. In particular, the variational quantum eigensolver (VQE) algorithm and the quantum approximate optimization algorithm (QAOA) do not demand the same degree of quantum resources as do the well-known Shor's factoring and Grover's search algorithm. These new algorithms are used to solve the ground-state energy problem and the well-known, NP-hard combinatorial optimization problem MAXCUT, respectively. Therefore, these algorithms give hope for solving useful problems on near-term quantum hardware.

There are a number of limiting factors that must be overcome to implement useful instances of these algorithms on near-term quantum devices. First, the device needs to bear a sufficiently large number of qubits. Otherwise, classical methods for solving the problem will outperform the quantum computer. Second, the processes, or quantum gates, on the quantum computer need to be of sufficiently high fidelity. Low fidelity quantum gates will output quantum states with degraded coherence, and coherent output states are necessary for many of these applications. The performance of algorithms such as VQE and QAOA can, in principle, can be systematically improved by including more and more layers of quantum gates. The number of layers of gates is referred to as the circuit depth. By increasing the circuit depth, one increases the expressibility of the output state. For example, the maximal degree of quantum entanglement in the output state is related to the depth of the circuit preparing the state. Preparing a variety of entangled states in a coherent fashion is necessary for the functioning of many algorithms. Therefore, when executing a quantum algorithm such as VQE or QAOA, one seeks to maximize the expressibility of the circuit, while at the same time minimizing the decoherence of the output state.

Ideally, a quantum computer would implement perfect gates, so that one would not need to decrease depth to minimize decoherence. This is not, however, possible in practice.

SUMMARY

A quantum optimization system and method estimate, on a classical computer and for a quantum state, an expectation value of a Hamiltonian, expressible as a linear combination of observables, based on expectation values of the observables; and transform, on the classical computer, one or both of the Hamiltonian and the quantum state to reduce the expectation value of the Hamiltonian.

Other features and advantages of various aspects and embodiments of the present invention will become apparent from the following description and from the claims.

In a first aspect, a quantum optimization method includes estimating, on a classical computer and for a quantum state, an expectation value of a Hamiltonian, expressible as a linear combination of observables, based on expectation values of the observables. The quantum optimization method also includes transforming, on the classical computer, one or both of the Hamiltonian and the quantum state to reduce the expectation value of the Hamiltonian.

In certain embodiments of the first aspect, the method further includes measuring the expectation value of each of the observables on a quantum computer by generating the quantum state on the quantum computer, and measuring, on the quantum computer, each of the observables for the quantum state.

In certain embodiments of the first aspect, generating the quantum state includes generating the quantum state with a parametrized quantum circuit programmable via one or more circuit parameters.

In certain embodiments of the first aspect, the method further includes updating the one or more circuit parameters such that the parametrized quantum circuit outputs an updated quantum state that better approximates a ground state of the Hamiltonian.

In certain embodiments of the first aspect, the method further includes repeating (i) generating the quantum state with the parametrized quantum circuit, (ii) measuring each of the observables for the quantum state, (iii) transforming one or both of the Hamiltonian and the quantum state, (iv) updating the Hamiltonian based on the transforming, and (v) updating the one or more circuit parameters, until the one or more circuit parameters have converged.

In certain embodiments of the first aspect, transforming one or both of the Hamiltonian and the quantum state includes applying a unitary transformation to said one or both of the Hamiltonian and the quantum state.

In certain embodiments of the first aspect, the method further includes generating, on the classical computer, the expectation value of each of the observables.

In certain embodiments of the first aspect, the method further includes updating, on the classical computer, a first representation of the quantum state based on the expectation value of the Hamiltonian to better approximate a ground state of the Hamiltonian.

In certain embodiments of the first aspect, the method further includes repeating (i) generating the expectation value of each of the observables, (ii) transforming one or both of the Hamiltonian and the quantum state, and (iii) updating the first representation of the quantum state, until the first representation of the quantum state has converged.

In certain embodiments of the first aspect, the linear combination of the observables includes at least one observable with a zero weight that becomes non-zero due to said transforming the Hamiltonian. Furthermore, the expectation values of the observables include an expectation value for the at least one observable with a zero weight.

In certain embodiments of the first aspect, transforming one or both of the Hamiltonian and the quantum state includes applying a fermionic transformation to the one or both of the Hamiltonian and the quantum state.

In certain embodiments of the first aspect, the fermionic transformation includes rotations of active orbitals.

In certain embodiments of the first aspect, the fermionic transformation includes transformations out of an active space to incorporate at least one of a core orbital and a virtual orbital.

In certain embodiments of the first aspect, the fermionic transformation includes rotations that respect one or more of an open-shell spin symmetry, a closed-shell spin symmetry, and a geometric symmetry.

In certain embodiments of the first aspect, the method further includes implementing a quantum subspace expansion technique.

In certain embodiments of the first aspect, the method further includes implementing a marginal projection technique.

In certain embodiments of the first aspect, the method further includes obtaining any of the expectation values the observables via orbital frames.

In certain embodiments of the first aspect, transforming one or both of the Hamiltonian and the quantum state includes applying a *Majorana* fermionic transformation to the one or both of the Hamiltonian and the quantum state.

In certain embodiments of the first aspect, the method further includes minimizing the expectation value of the Hamiltonian using a Givens parameterization.

In certain embodiments of the first aspect, the method further includes minimizing the expectation value of the Hamiltonian using semidefinite programming.

In certain embodiments of the first aspect, transforming one or both of the Hamiltonian and the quantum state includes applying a spin transformation to the one or both of the Hamiltonian and the quantum state.

In certain embodiments of the first aspect, the method further includes minimizing the expectation value of the Hamiltonian using semidefinite programming.

In certain embodiments of the first aspect, the Hamiltonian is an Ising Hamiltonian configured for solving a combinatorial optimization problem.

In certain embodiments of the first aspect, the method further includes minimizing the expectation value of the Hamiltonian using semidefinite programming.

In certain embodiments of the first aspect, transforming one or both of the Hamiltonian and the quantum state includes minimizing the expectation value of the Hamiltonian estimated for the quantum state.

In certain embodiments of the first aspect, minimizing the expectation value of the Hamiltonian includes minimizing the expectation value of the Hamiltonian using semidefinite programming.

In a second aspect, a computer system configured for quantum optimization includes a processor and a memory communicably coupled with the processor and storing machine-readable instructions. Wen executed by the processor, the machine-readable instructions control the computing system to estimate, for a quantum state, an expectation value of a Hamiltonian, expressible as a linear combination of observables, based on expectation values of the observables. The machine-readable instructions also control the computing system to transform one or both of the Hamiltonian and the quantum state to reduce the expectation value of the Hamiltonian estimated for the quantum state.

In certain embodiments of the second aspect, the computing system includes a quantum computer that is communicably coupled with the processor and configured to measure the expectation value of each of the observables.

DETAILED DESCRIPTION

Figure 1:
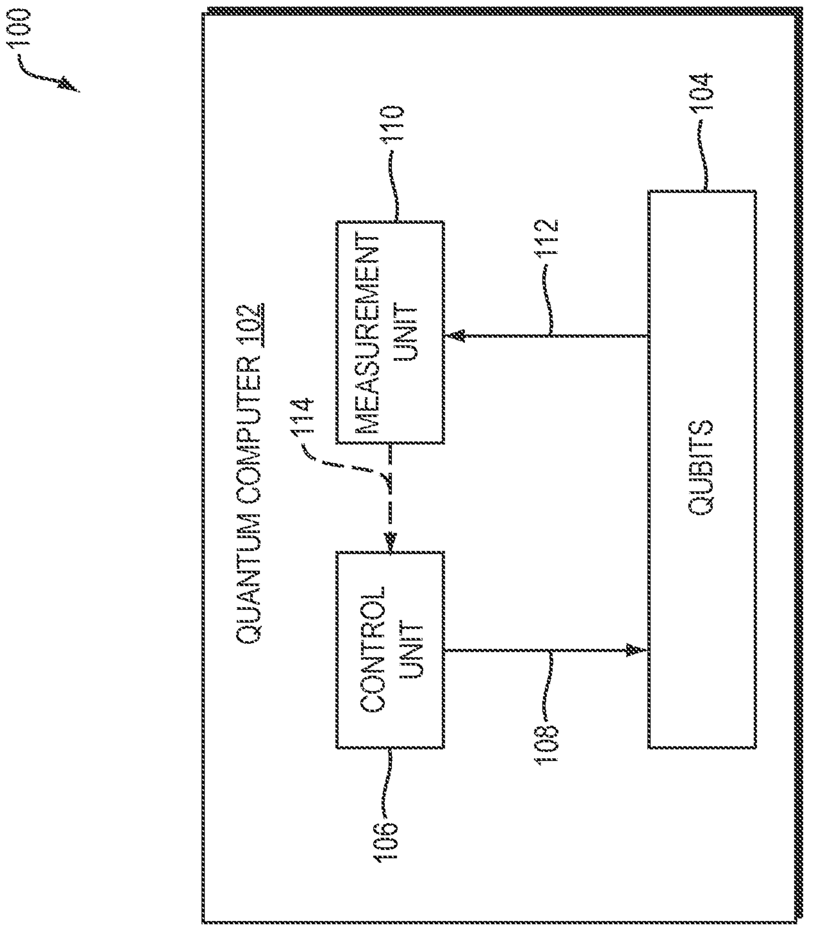
FIG. 1 is a diagram of a quantum computer according to one embodiment of the present invention.

Embodiments of the present invention are directed to a quantum computer which effectively appends quantum gates to a variational quantum circuit to artificially extend the depth of the circuit. When the quantum computer executes variational quantum algorithms, the resulting estimates that are output by the quantum computer are of higher quality than the estimates produced by quantum computers without the appended quantum gates.

Embodiments of the present invention extend the capabilities of quantum computers for solving problems such as, but not limited to, ground state energy calculations and combinatorial optimization. Quantum computers implemented according to embodiments of the present invention require little to no additional quantum computational overhead compared to existing quantum computers because the same effect as appending quantum gates, or increasing circuit depth, is achieved by postprocessing data on a classical computer, without adding any actual quantum gates to the quantum computer.

Embodiments of the present invention may include performing some computations using a classical computer and other computations using a quantum computer. The computations (e.g., optimization routines) executed by the classical computer may be performed in parallel with the computations performed by the quantum computer. In general, the classical and quantum processors may work in tandem to provide an approximately optimal answer. In general, the role of the quantum computer is to generate statistically sampled bit strings, and the role of the classical processor is to analyze these sampled bit strings and to adapt the quantum processor accordingly.

Embodiments of the present invention use quantum computation data that is typically not used, to improve the utility of the quantum computer. In particular, typically when a quantum computer executes a variational quantum algorithm to produce a plurality of output values (e.g., Pauli product expectation value estimates), only a single fixed linear combination of such values is typically used. In contrast, embodiments of the present invention use a plurality of linear combinations of the individual output values, not merely the fixed linear combination of those values, which results in a better estimate of the optimal value being targeted. Quantum computers implemented according to embodiments of the present invention exploit algebraic structure in the problem instance (e.g., the quantum Hamiltonian) to process this data and to output a lower estimate of the ground state energy.

As stated above, ideally a quantum computer would implement perfect gates, so that one would not need to decrease circuit depth to minimize decoherence. This is not, however, possible in practice, because an increased circuit depth results in increased decoherence. Embodiments of the present invention implement a compromise by using additional classical processing to achieve the same effect as appending ideal quantum gates to the end of the sequence of imperfect quantum gates implemented on the quantum computer. This improves the expressibility of the parameterized quantum circuit, while not detracting from the coherence of the output state. More specifically, in embodiments of the present invention, a quantum computer, having imperfect gates, repeatedly executes a quantum circuit followed by quantum measurement to produce initial output data. A classical computer then processes the initial output data. This classical post-processing effectively appends a sequence of perfect quantum gates to the imperfect gates of the quantum computer. The term "expressibility" refers to the ability of the quantum computer to generate a variety of highly coherent entangled quantum states as the output of the quantum circuit.

Embodiments of the present invention can be used to extend the capabilities of quantum computers when implementing variational quantum algorithms such as VQE or QAOA by producing more accurate results and/or tackling larger problem instances. Such quantum algorithms are used to efficiently generate good approximate solutions to ground state energy problems and combinatorial optimization problems, which have application to drug and materials discovery, as well as route optimization and artificial intelligence.

Some of the embodiments described herein generate, measure, or utilize quantum states that approximate a target quantum state (e.g., a ground state of a Hamiltonian). As will be appreciated by those skilled in the art, there are many ways to quantify how well a first quantum state "approximates" a second quantum state. In this description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled E). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

In the prior art variational quantum algorithm, the problem Hamiltonian may be defined and mapped to a sum of Pauli product terms. The quantum state may then be prepared, and the expectation value of each Pauli term may be measured on the quantum computer. The energy expectation value may then be estimated, and a classical optimization routine may be used to suggest new state preparation parameters based on the energy expectation value estimate. The algorithm may then return to the beginning and prepare the updated quantum state based on the updated circuit parameters.

A quantum computer implemented according to an embodiment of the present invention (which may operate under the control of a classical computer) may also begin by defining the problem Hamiltonian and mapping the problem Hamiltonian to a sum of Pauli product terms. A quantum computer implemented according to an embodiment of the present invention may prepare the quantum state and measure the expectation value of each Pauli term. The quantum computer implemented according to an embodiment of the present invention, or a classical computer which receives output of the previous steps from the quantum computer, may then perform a marginals optimization procedure (MOP), such as by optimizing energy and updating the Hamiltonian. The classical computer may then optimize the energy in any of a variety of ways by exploiting structure in the marginal expectation values to carry out additional minimization steps towards obtaining the minimum energy. The outputs of this energy optimization are the optimized energy value and the optimal transformation, both of which may be used to update the Hamiltonian.

Once the energy has been optimized and the Hamiltonian has been updated, the quantum computer implemented according to an embodiment of the present invention may update the circuit parameters based on the estimated energy of the updated Hamiltonian, as is typically done in, for example, the variational quantum eigensolver algorithm, and then return to step 1 and prepare the updated quantum state based on the updated circuit parameters. The quantum computer implemented according to an embodiment of the present invention may repeat the process just described any number of times.

A general method of the marginals optimization procedure will now be described in more detail. The marginals optimization procedure makes use of quantum marginal data during the course of a variational quantum algorithm to accelerate the optimization of the algorithm. Such algorithms are examples of hybrid quantum-classical algorithms, in which a quantum processor and classical processor work in tandem to execute an algorithm. Towards this end, the method introduced herein aims to ramp up the effort of the classical processor so as to extract as much utility from the quantum computer's data output as possible.

Variational quantum algorithms such as VQE and QAOA work as follows:

1. The problem Hamiltonian is defined and mapped to a sum of Pauli product terms $H=\Sigma_i h_i P_i$ on N qubits, where $$P_i = \sigma_1^{\mu_{i,1}} \otimes \ldots \otimes \sigma_N^{\mu_{i,N}}.$$

2. A variational quantum circuit $U_T(\theta_T) \ldots U_1(\theta_1)$ prepares quantum states, $|\psi(\vec{\theta})\rangle = U_T(\theta_T) \ldots U_1(\theta_1)|0\rangle^{\otimes N}$.
3. The expectation value of each Pauli term, $\langle P_i \rangle$, is measured on the quantum computer, with respect to the prepared state $|\psi(\vec{\theta})\rangle$. This is achieved by repeatedly preparing $|\psi(\vec{\theta})\rangle$ and measuring it in the Pauli basis of $P_i$ to record a binary outcome ±1 in each shot.
4. The energy expectation value is estimated as $\langle H \rangle = \Sigma_i h_i \langle P_i \rangle$.

5. A classical optimization routine is used to suggest new state preparation parameters based on the energy expectation value estimate. (Note: depending on the classical optimization routine, multiple loss function evaluations may be executed before new circuit parameters are suggested.)
6. Return to Step 1, preparing the updated state.

MOP may, for example, replace Step 3 above as follows. An observation of MOP is that there is structure in the marginal expectation values $\langle P_i \rangle$ which may be exploited to carry out an additional minimization step towards obtaining the minimum energy. Generally, depending on the structure of the Hamiltonian, there may be a group of unitary operations $U_R$ which preserves the space of marginals:

$$U_R^\dagger P_i U_R = \sum_j R_i^j P_j.$$

This enables a free depth increase of the variational quantum circuit, boosting the opportunity to drive the state preparation towards the ground state. By carrying out the following optimization routine, MOP may search about a manifold of quantum states to find a better approximation to the ground state energy in each loop of the variational quantum algorithm:

$$\min_R \sum_i h_i R_i^j \langle P_j \rangle$$

subject to "certain conditions on $R$"

There are several possible ways to carry out this optimization routine. We will describe examples of concrete methods for carrying out the optimization for each of the example applications.

The outputs of this marginals optimization procedure are the optimized energy value and the optimal transformation $R_*$. It is useful to view this transformation as a Heisenberg transformation of the target Hamiltonian:

$$H_n \to H_{n+1} \equiv \sum_{i,j} h_i^{(n)} R_i^j P_j = \sum_j h_j^{(n+1)} P_j,$$

where n indexes the Hamiltonian coefficients in the nth loop of the variational quantum algorithm. Such a transformation does not change the spectrum of the Hamiltonian, and thus the ground state energy of $H_n$ is equal to the ground state energy of H. The value of transforming the Hamiltonian is that the variational circuit may be better able to prepare an approximation to the ground state of $H_n$ than to the ground state of the initial Hamiltonian H.

The MOP-enhanced variational quantum algorithm may then work as follows:

1. The problem Hamiltonian is defined and mapped to a sum of Pauli product terms $H_0 = \Sigma_i h_i P_i$ on N qubits, where $$P_i = \sigma_1^{\mu_{i,1}} \otimes \ldots \otimes \sigma_N^{\mu_{i,N}}.$$

2. A variational quantum circuit $U_T(\theta_T) \ldots U_1(\theta_1)$ prepares quantum states, $|\psi(\vec{\theta})\rangle = U_T(\theta_T) \ldots U_1(\theta_1) |0\rangle^{\otimes N}$.
3. The expectation value of each Pauli term, $\langle P_i \rangle$, is measured on the quantum computer, with respect to the prepared state $|\psi(\vec{\theta})\rangle$. This is achieved by repeatedly preparing $|\psi(\vec{\theta})\rangle$ and measuring it in the Pauli basis of $P_i$ to record a binary outcome $\pm 1$ in each shot.
4. The classical optimization routine $$\min_R \sum_{i,j} h_j R_i^j \langle P_i \rangle$$

is carried out, which outputs the updated energy expectation value $$\sum_{i,j} h_j [R_*]_i^j \langle P_i \rangle$$

and updated Hamiltonian $$H_n \to H_{n+1} = \sum_{i,j} h_j [R_*]_i^j P_i,$$

where $R_*$ is the optimal transformation which acts unitarily on the Hamiltonian.

5. An additional classical optimization routine is used to suggest new state preparation parameters based on the energy expectation value estimate. (Note: depending on the classical optimization routine, multiple loss function evaluations may be executed before new circuit parameters are suggested.)
6. Return to Step 1, preparing the updated state.

More generally, it may be the case that a finite number of additional marginals $Q_j$ should be added in order that the space of marginals, now $\{P_i, Q_j\}$, is preserved by $U_R$. When the size of the set $\{P_i, Q_j\}$ grows no more than polynomially in the number of qubits, for a given application, MOP remains computationally efficient.

It is valuable to view MOP in light of the N-representability problem, or, more generally, the quantum marginal problem. Literature on these problems highlights the fact that the energy expectation value of a k-body Hamiltonian on N qubits is a function of at most $$O\left(\binom{N}{K} 4^k\right)$$

parameters, as opposed to the $O(4^N)$ needed to describe the state. Furthermore, the space of $$O\left(\binom{N}{K} 4^k\right)$$

parameters forms a convex set. At first glance, it seems, then, that the problem of energy minimization should be efficiently solvable by carrying out a convex optimization in this few-parameter space. The catch, however, is the fact that the convex set of valid parameter values does not admit a tractable characterization. Moreover, the N-representability problem and quantum marginal problem have been shown to be QMA-complete.

Through MOP, we gain a more general perspective on the role of the quantum computer in variational quantum algorithms. The quantum computer supplies valid quantum marginal data, while the classical processor calculates energy expectation values and solicits new marginal data through new state preparations. While the standard approach to VQE carries out the optimization based only on the energy expectation value, MOP carries out an additional optimization exploiting the available valid quantum marginal data. Thus, rather than just energy expectation values, the commodity supplied by the quantum computer appears to be the valid quantum marginal data.

We describe MOP as applied, for example, to the case of a Fermionic two-body Hamiltonian. Consider the general fermionic Hamiltonian with Coulomb repulsion in second-quantization form, $$H=\sum_{i,j} S^{ij} a_i^\dagger a_j + \sum_{i,j,k,l} D^{ijkl} a_i^\dagger a_j^\dagger a_k a_l,$$

and where the $S_{ij}$ account for a "number penalty" term to force the output to be of the proper particle number. When implementing the standard variational quantum eigensolver, the algorithm concludes with an optimized state preparation using a variational circuit outputting the state $p(\overrightarrow{\mathbf{74}}_*)$, for which the energy is estimated, up to sampling error, according to $$\langle E(\vec{\theta}_*)\rangle = Tr(H\rho(\vec{\theta}_*)),$$

where $\rho(\vec{\theta}_*)$ accounts for implementation and readout error. In the final round of VQE, the expectation value of, in general, each term $$V_{ij}=Tr\left(a_i^\dagger a_j \rho(\vec{\theta}_*)\right) \text{ and } W_{ijkl}=Tr\left(a_i^\dagger a_j^\dagger a_k a_l \rho(\vec{\theta}_*)\right)$$

has been computed. These values are known as the 1- and 2-particle reduced density matrices (RDMs). We show how, with just classical post-processing, these RDMs can be used to improve the ground state energy estimation.

First, consider the case that a sequence of error-free, tunable gates $U_{\vec{\lambda}}$ could be applied at the end of the variational circuit, producing $\rho(\vec{\lambda},\vec{\theta}_*)\equiv U(\vec{\lambda})\rho(\vec{\theta})U(\vec{\lambda})^\dagger$. Then, minimizing the energy with respect to tuning the parameters $\vec{\lambda}$ would, in the worst case, maintain the energy expectation estimation, while in many cases it would lower it. Of course, in practice, introducing such gates is costly because the coherence of the output state is compromised by the additional error from these gates. However, we can achieve the effect of implementing these gates by a particular post-processing technique that we call the marginals optimization procedure (MOP).

Consider re-expressing the energy expectation with these additional gates in the Heisenberg picture, $$\langle H\rangle = Tr\left(HU(\vec{\lambda})\rho(\vec{\theta})U(\vec{\lambda})^\dagger\right) = Tr\left(U(\vec{\lambda})^\dagger HU(\vec{\lambda})\rho(\vec{\theta})\right).$$

In the example of the fermionic Hamiltonian, if we choose the gates $U(\vec{\lambda})$ to correspond to fermionic orbital rotations, then their action on the creation or annihilation operators of the Hamiltonian is to output a linear combination of creation or annihilation operators, respectively, $$\langle H\rangle = \sum_{i,j} S^{ij} Tr\left(U_R^\dagger a_i^\dagger a_j U_R \rho(\vec{\theta})\right) + \sum_{i,j,k,l} D^{ijkl} Tr\left(U_R^\dagger a_i^\dagger a_j^\dagger a_k a_l U_R \rho(\vec{\theta})\right) = S^{ij} R_i^I R_j^{J*} Tr\left(a_I^\dagger a_J \rho(\vec{\theta})\right) + D^{ijkl} R_i^{I*} R_j^{J*} R_k^K R_l^L Tr\left(a_I^\dagger a_J^\dagger a_K a_L \rho(\vec{\theta})\right),$$

where the summation is inferred by Einstein notation and the R tensors are orbital rotation matrices characterized by an element of SU(N), where N is the number of spin orbitals. Noticing that the traces are simply the 1-RDMs V and 2-RDMs W of $\rho(\vec{\theta})$, as estimated on the quantum computer, we find that we can efficiently (in the number of spin orbitals) compute the expected energy of the states $$U_R\rho(\vec{\theta})U_R^\dagger,$$

$$\langle H\rangle = Tr(SRVR^\dagger) + Tr(D(R\otimes R)W(R^\dagger\otimes R^\dagger)),$$

where we have reshaped S,V and D,W into N-by-N and $N^2$-by-$N^2$ matrices, respectively. Finally, by carrying out the following optimization problem we can, in general, obtain an improved estimate of the ground state energy, $$\min_R Tr(SRVR^\dagger) + Tr(D(R\otimes R)W(R^\dagger\otimes R^\dagger))$$
$$\text{subject to } RR^\dagger = I \text{ and } R^\dagger R = I$$

where the two conditions on R ensure unitarity. The energy expectation value obtained from this optimization is ensured to be at most that estimated in the initial VQE experiment. As motivated by the orbital-optimized coupled cluster method and the Breuckner coupled cluster method such orbital rotations stand to improve the energy estimates in practice. The minimization problem above can be approached in a number of ways. While black-box optimization may be used, it may be useful to employ a method which exploits the structure in the optimization problem. We emphasize that the marginals optimization procedure is independent of the particular optimization routine chosen, and we will discuss alternative optimization routines later on.

Finally, we note that, for the Fermionic case, the marginals optimization procedure can be implemented in both a restricted and extended regime. We will discuss these variants in more detail later on. In the first case, it may be that the Hamiltonian does not depend on certain marginals. This may happen, for example, if the Hamiltonian possesses certain symmetries. In such cases, it may be useful to consider just a subgroup of all possible orbital rotations. Indeed, it is possible to restrict the orbital optimization of the equation above to just a subgroup of orbital optimizations. An explicit example of this would be the case where the Hamiltonian possessed spin-symmetry. Then, one may want to restrict the optimization to rotations of just the spatial orbitals. For the second case, consider that the initial Hamiltonian accounted only for a subspace of active orbitals. Following a VQE calculation one may want to extend the orbital rotations in order to involve orbitals from the inactive space. Such restrictions and extensions are analogous to standard techniques in quantum chemistry.

The application of the marginals optimization procedure to VQE with a unitary coupled-cluster (UCC) ansatz may be viewed as a novel adaption of the classical orbital-optimized coupled cluster (OCC) and Breuckner coupled cluster (BCC) algorithms to quantum computers. The OCC and BCC approaches are based on an ansatz comprised of an orbital rotation and a coupled cluster operator which are simultaneously optimized using a classical computer.

The notion of restricting the orbital rotation to have the same effect on spin-up and spin-down orbitals is analogous to the treatment of spin in other methods based on orbital rotations, such as Hartree-Fock theory and Kohn-Sham density-functional theory. MOP without the spin restriction is analogous to unrestricted Hartree-Fock (UHF), while MOP with spin restrictions is analogous to restricted Hartree-Fock (RHF) in the case of closed-shell systems and restricted open-shell Hartree-Fock (ROHF) in the case of open-shell systems.

The general marginal optimization procedure includes, but is not limited to, using Hamiltonians decomposed into a linear combination of Pauli strings. The only requisite is that estimates for certain quantum marginal data be obtained. An example of using the marginals optimization procedure where the Hamiltonian is not decomposed into Pauli strings is as follows. The orbital frames method [Motta, Mario, et al. "Low rank representations for quantum simulation of electronic structure." arXiv preprint arXiv:1808.02625 (2018)] provides a decomposition of the Hamiltonian in terms of products of fermionic number operators, each rotated by an orbital transformation:

$$H = \sum_{\ell=1}^{L}\left[\sum_{i_1}^{N} g_{i_1}^{(\ell,1)} n_{i_1}^{(\ell)} + \sum_{i_1,i_2=1}^{N} g_{i_1 i_2}^{(\ell,2)} n_{i_1}^{(\ell)} n_{i_2}^{(\ell)} + \sum_{i_1,i_2,i_3=1}^{N} g_{i_1 i_2 i_3}^{(\ell,3)} n_{i_1}^{(\ell)} n_{i_2}^{(\ell)} n_{i_3}^{(\ell)} + \cdots \sum_{i_1,i_2,\cdots i_K=1}^{N} g_{i_1 i_2 \cdots i_K}^{(\ell,3)} n_{i_1}^{(\ell)} n_{i_2}^{(\ell)} \cdots n_K^{(\ell)}\right],$$

where $$g^{(\ell,k)}$$

represent coefficients for the k-body terms obtained from a decomposition of the Hamiltonian, L is the number of frames in the decomposition, K is the highest order term appearing in the Hamiltonian and is equal to 2 when the Hamiltonian is the electronic structure Hamiltonian, $i_m$ indexes the spin orbitals, and the number operators are $$n_i^{(\ell)} = a_i^{(\ell)\dagger} a_i^{(\ell)} \tag{1}$$

with $$a_i^{(\ell)\dagger} \text{ and } a_i^{(\ell)}$$

being the creation and annihilation operators corresponding to the single-particle orbital $$\psi_i^{\ell} = \sum_j U_{ji}^{(\ell)} \phi_j$$

where $U^{(\ell)}$ is an N×N matrix obtained from the decomposition, $\ell$ a is the index of single-particle orbital bases $$\{\psi_i^{(\ell)}\}$$

(where i runs from 1 to N) obtained by the decomposition, and by which each value of l indexes a different, so-called, orbital frame.

For a k-body Hamiltonian decomposed in terms of orbital frames, the fermionic marginals up to k-body may be determined by the expectation values of the $$n_{i_1}^{(\ell)} \ldots n_{i_m}^{(\ell)}.$$

Specifically, the fermionic marginals $$a_{i_1} \ldots a_{i_m}$$

may be reconstructed as appropriate linear combinations of the estimated expectation values $$\langle n_{i_1}^{(\ell)} \ldots n_{i_m}^{(\ell)} \rangle$$

With the reconstructed fermionic marginals, the marginals optimization procedure may be performed.

To carry out MOP, the transformation on the marginals must be parameterized. One method for parameterizing a unitary or an orthogonal matrix is with an exponential generator. In the unitary case, any anti-Hermitian matrix A generates a corresponding unitary $U_A$ via the matrix exponential $U_A=\exp(A)$. Similarly, for the real orthogonal transformation case using in the *Majorana* fermionic transformations, any real anti-symmetric matrix B generates a corresponding orthogonal matrix $O_B=\exp(B)$. The coordinates of these matrices A and B constitute the parameters that are varied in a black box optimization used to carry out the marginals optimization.

In carrying out the optimization subroutine of the marginals optimization procedure, it may be beneficial to choose a parameterization of the rotation matrix R which yields analytic gradients. One way to achieve this in the case of fermionic or *Majorana* fermionic orbital rotations is to employ a, so-called, Givens decompositions of the rotation matrix. Givens decompositions are closely related to "match gate circuits" which are able to be efficiently simulated and give a decomposition of *Majorana* fermionic orbital transformations. The Givens decomposition of the orbital transformation gives a parameterization of the rotation where the gradient of the energy with respect to these parameters is efficiently computable.

The marginals optimization procedure may be used in conjunction with a number of existing techniques for improving the performance of variational quantum algorithms. One example is the quantum subspace expansion technique introduced in [McClean, Jarrod R., et al. "Hybrid quantum-classical hierarchy for mitigation of decoherence and determination of excited states." Physical Review A 95 (2017): 042308]. In the quantum subspace expansion, a set of operators $\{O_i\}$ is used to generate a subspace of states spanned by $$\{O_i \rho O_j^\dagger\}.$$

The expectation values $$H_{ij} = Tr\left(\hat{H} O_i \rho O_j^\dagger\right)$$

and $$S_{ij} = Tr\left(O_i \rho O_j^\dagger\right)$$

are measured and then used to solve the generalized eigenvalue problem $Hv=\lambda Sv$. The minimum eigenvalue gives the minimum energy of the Hamiltonian H in the subspace. This technique has been shown to mitigate error and to improve the performance of optimization. The marginals optimization procedure may be used in conjunction with quantum subspace expansion as follows. After carrying out a round of marginals optimization to produce an updated Hamiltonian $H \rightarrow H'$, quantum subspace expansion may be performed with respect to the updated Hamiltonian.

The marginal estimates obtained during a variational quantum algorithm will incur a degree of error due to statistical sampling error and device error. This can lead to the set of estimated marginals being invalid, as defined by the well-known quantum marginals problem or, in the fermionic case, the N-representability problem. The marginals projection technique introduced in [Rubin, Nicholas C., Ryan Babbush, and Jarrod McClean. "Application of fermionic marginal constraints to hybrid quantum algorithms." New Journal of Physics 20 (2018): 053020] gives a method for adjusting the estimated marginal values to bring them closer to the set of valid marginals in the case of fermionic problem instances. This technique may be used in conjunction with the marginals optimization procedure by first applying the marginals projection technique to obtain a less-errored set of marginal estimates and then using these improved marginal estimates as input to the marginals optimization procedure.

MOP may be used in a number of different applications. The choice of unitary transformations that are optimized over depend on the structure of the Hamiltonian and may vary from problem to problem. We describe three general classes of transformations: orbital rotations, *Majorana* rotations, and local unitary transformations. For each class we discuss example applications.

In quantum chemistry and materials science, a basic subroutine is the determination of the ground state energy. The cost of running classical algorithms for accurately estimating the ground state energy of a molecule or material grows exponentially in the number of electron orbitals considered. Several quantum algorithms have been proposed for estimating ground state energies. Recently, the variational quantum eigensolver has attracted significant attention from the quantum computing community because of its prospects for implementation on near-term devices.

In many quantum chemistry and materials settings, the system of interest is described by the general fermionic two-body Hamiltonian as previously described. During the course of a VQE implementation, which attempts to determine the ground state energy of this Hamiltonian, the Hamiltonian can be adapted so as to systematically lower the ground state energy estimates. During the marginals optimization procedure, the following optimization problem may be solved:

$$\min_R Tr\left(SRVR^\dagger\right) + Tr\left(D(R \otimes R)W\left(R^\dagger \otimes R^\dagger\right)\right)$$

$$\text{subject to } RR^\dagger = I \text{ and } R^\dagger R = I$$

Blackbox non-linear programming techniques, such as MATLAB's built-in fmincon function or the scipy-optimize optimization module can be used to carry out this optimization. We describe a more theoretically-motivated alternative with performance guarantees that is based on semidefinite programming relaxation methods.

In typical quantum chemistry problems, many of the two-body fermionic Hamiltonian coefficients, or integrals, will be zero. For example, if $a_i$ and $a_j$ correspond to states with different spin, then $S^{ij}$ will be zero and the corresponding marginal $V_{ij}$ need not be measured. Restricting R to be block diagonal, with one block corresponding to spin up orbitals and another block corresponding to spin down orbitals, will prevent the rotation from affecting terms in the Hamiltonian that are zero due to spin considerations.

In some cases, it may be advantageous to consider only orbital rotations that have the same effect on both spin-up and spin-down orbitals (i.e., the two blocks of R are identical). For example, such a restriction could be useful for constraining the variational minimization to closed-shell wavefunctions (i.e., states that are invariant with respect to spin rotations). Provided that the state $\rho(\vec{\theta}_*)$ is a closed-shell state and that the spatial orbitals corresponding to the spin-up and spin-down spin orbitals are identical, restricting the rotation to have the same effect on spin-up and spin-down orbitals ensures that the transformed state is closed-shell and reduces the number of parameters that must be optimized via MOP. It may also be advantageous to restrict the blocks of R to be identical for some open-shell cases. For example, restricting R may be required to ensure that the transformed state is an eigenstate of the total spin operator. Such constraints manifest as homogeneous linear constraints on R, which will translate into homogeneous linear constraints on $R \otimes R^\dagger$ that can be easily incorporated into the semidefinite programming method as described below.

We introduce an optimization method which is tailored to the fermionic Hamiltonian. We adapt the previous optimization problem into a more-tractable form. First, we reshape the unitaries R into $N^2$ dimensional vectors $|R)$, allowing us to rewrite the minimization problem as $$\min_{|R\rangle} \langle R|V \otimes S^T|R\rangle + \langle RR|(I \otimes X_{23} \otimes I)W \otimes D^T(I \otimes X_{23} \otimes I)|RR\rangle$$

$$\text{subject to } \langle R|(I \otimes |i\rangle\langle j|)R\rangle = \delta_{ij} \text{ and } \langle R|(|i\rangle\langle j| \otimes I)|R\rangle = \delta_{ij}$$

where $X_{23}$ is the swap operator on the second and third systems. Next, noting that $\rangle R|V \otimes S^T|R\langle = \rangle RR|V \otimes S^T \otimes I \otimes I|RR\langle$, and defining $$M = V \otimes S^T \otimes I \otimes I + (ity \otimes X_{23} \otimes I)W \otimes D^T(I \otimes X_{23} \otimes I),$$

we simplify the optimization problem to $$\min_{|R\rangle} \langle RR|M|RR\rangle$$

$$\text{subject to } \langle R|(I \otimes |i\rangle\langle j|)R\rangle = \delta_{ij} \text{ and } \langle R|(|i\rangle\langle j| \otimes I)|R\rangle = \delta_{ij}$$

We introduce the self-consistency approach, where we iteratively solve restricted versions of the above optimization problem. To summarize, we fix one of the rotation matrices, optimize with respect to the other, and then, in the next iteration, set the fixed rotation matrix to the optimal rotation matrix of the previous iteration. In this approach, the optimization of each iteration may be carried out using the following semidefinite relaxation technique. Defining $M_i \equiv (I \otimes \rangle R_i|)M(I \otimes |R_i\langle)$, where $R_i$ is the fixed rotation, the optimization problem becomes, $$\min_{|R\rangle} \langle R|M_i|R\rangle$$

$$\text{subject to } \langle R|(I \otimes |i\rangle\langle j|)R\rangle = \delta_{ij} \text{ and } \langle R|(|i\rangle\langle j| \otimes I)|R\rangle = \delta_{ij}$$

The above minimization problem has the form of a quadratically-constrained quadratic programming problem. Such problems are, in general, NP-hard. A standard technique for obtaining approximate solutions is known as semidefinite relaxation. We propose a type of semidefinite relaxation method for generating approximate solutions to the above optimization problem. The first step is to express the optimization problem as nearly a semidefinite programming problem:

$$\min_{\rho} Tr(M_i\rho)$$

$$\text{subject to } Tr((I \otimes |i\rangle\langle j|)\rho) = \delta_{ij} \text{ and } Tr((|i\rangle\langle j| \otimes I)\rho) = \delta_{ij}$$

$$\rho \geq 0$$

$$\rho \text{ is rank-one}$$

The problem is not a semidefinite program, however, because of the non-convex rank-one constraint. The semidefinite relaxation method then relaxes the rank-one constraint and solves the resulting semidefinite program, which only takes polynomial-time in the dimension of $\rho$. The optimal value $\rho_*$ is then used to generate rank-one candidate solutions, of which the optimal one is taken as the approximate solution. The candidates $|K\langle$ are obtained by sampling from the multivariate normal distribution $\mathcal{N}(0,\rho_*)$, where $\rho_*$ serves as the covariance matrix. The sampled vectors $|K\langle$ do not necessarily satisfy the quadratic constraints of unitarity given in the minimization problems above, and are likely infeasible. To generate feasible candidates these samples must be rounded, which is a standard technique in semidefinite relaxation methods. We choose to round each sample $|K\langle$ to the closest unitary in distance given by the Frobenius norm. If $K=USV^\dagger$ is the singular value decomposition of K, the closest unitary to K is given by $W=UV^\dagger$. Thus, we round $|K\langle$ by vectorizing to obtain matrix K, computing the singular value decomposition $K=USV^\dagger$, and then taking the rounded $R_*=UV^\dagger$ to be the candidate rotation. By generating many samples and choosing the best one, we boost the chances of generating a good candidate rotation. From the best sample, we obtain our approximate solution to the optimization problem and plug this in to the fixed rotation to the next round of iteration: $R_{i+1}=R_*$. This procedure is continued until the improvement in energy from one round to the next falls below some threshold.

We also introduce a direct semidefinite relaxation approach. For any fermionic Hamiltonian, we may implement the marginal optimization procedure using a more general group of unitary transformations than just orbital rotations. This group is known as the Bogoliubov transformations. Such transformations map linear combinations of fermionic creation to linear combinations of creation and annihilation operators. Bogoliubov transformations have a simple characterization in terms of *Majorana* operators $$\gamma_{2i} = (a_i + a_i^\dagger)/t2 \text{ and } \gamma_{2i+1} = (a_i - a_i^\dagger)/\sqrt{2}\, i.$$

These operators satisfy the elegant, single commutation relation $$\{\gamma_\nu, \gamma_\mu\} = \delta_{\nu\mu} I.\ U_S = \sum_\mu S_\nu^\mu \gamma_\mu,$$

where S is a real orthogonal transformation. The group of Bogoliubov transformations are simply the real rotations of the 2N vectors $\gamma_i$. This group contains, as a subgroup, the orbital rotation group SU(N) that was considered previously. Let $U_S$ be the unitary representation of a *Majorana* rotation and let $$S_\mu^\nu$$

be the matrix entries of the corresponding rotation in $\mathbb{R}^{2N}$, then each *Majorana* operator transforms as $$U_S^\dagger \gamma_\nu U_S = \sum_\mu S_\nu^\mu \gamma_\mu.$$

Such transformations alter the Hamiltonian as follows. In terms of *Majorana* operators, the original Hamiltonian is $$H=\sum_{v,\mu}\Sigma_{v\mu}\gamma_v\gamma_\mu+\sum_{v,\mu,\alpha,\beta}\Delta_{v\mu\alpha\beta}\gamma_v\gamma_\mu\gamma_\alpha\gamma_\beta,$$

where $\Sigma_{v\mu}$ and $\Delta_{v\mu\alpha\beta}$ are obtained from $S_{v\mu}$ and $D_{v\mu\alpha\beta}$. Making the replacement, $$U_S^\dagger\gamma_v U_S=\sum_\mu S_v^\mu\gamma_\mu,$$

we write the transformed Hamiltonian as $$H(S)=U_S^\dagger HU_S=\sum_{v,\mu}\Sigma_{v\mu}\sum_{n,m}S_v^nS_\mu^m\gamma_n\gamma_m+\sum_{v,\mu,\alpha,\beta}\sum_{n,m,a,b}\Delta_{v\mu\alpha\beta}S_v^nS_\mu^mS_\alpha^aS_\beta^b\gamma_n\gamma_m\gamma_a\gamma_b.$$

The marginals which may be computed for the marginals optimization procedure are of the form, $$\Lambda_{nm}=Tr\left(\gamma_n\gamma_m\rho(\vec{\theta_*})\right)$$

$$\Omega_{nmab}=Tr\left(\gamma_n\gamma_m\gamma_a\gamma_b\rho(\vec{\theta_*})\right).$$

Through either the Jordan-Wigner or Bravyi-Kitaev transformations, which map fermionic operators to qubit operators, the *Majorana* operators may be mapped to Pauli product operators. In computing the reduced density matrices $$Tr\left(a_i^\dagger a_j^\dagger a_k a_l\rho(\vec{\theta}_*)\right)$$

for a standard VQE problem, one may compute the expectations of the Pauli product operators which comprise the creation and annihilation operators. These Pauli product operators are precisely products of the *Majorana* operators. Consequently, in performing the marginals optimization procedure over Bogoliubov transformations, the relevant marginals $\Lambda_{nm}$ and $\Omega_{nmab}$, are simply those Pauli product expectation values which have been already computed. In terms of these *Majorana* operator marginals, we can write the Bogoliubov-transformed energy expectation value as $$\langle H(S)\rangle=Tr\left(\sum S\Lambda S^T\right)+Tr\left(\Delta(S\otimes S)\Omega\left(S^T\otimes S^T\right)\right),$$

where we have reshaped S,V and D,W into 2N-by-2N and $(2N)^2$-by-$(2N)^2$ matrices, respectively. Finally, by carrying out the following optimization problem we can, in general, obtain an improved estimate of the ground state energy, $$\min_S Tr\left(\sum S\Lambda S^T\right)+Tr\left(\Delta(S\otimes S)\Omega\left(S^T\otimes S^T\right)\right)$$

$$\text{subject to } SS^T=I \text{ and } S^TS=I$$

We can approach this optimization problem using the tools introduced above for the case of orbital rotation. The essential difference is that the matrices have all real entries, leading to solving a real semidefinite program.

Another common Hamiltonian model of interest is the spin Hamiltonian. This is used to describe the behavior of certain magnetic materials. In the case of spin-½ systems, the two-body Hamiltonian takes the general form $$H=\sum_{i,\mu}S_{i,\mu}\sigma_i^\mu+\sum_{i,\mu}D_{i,j,\mu,v}\sigma_i^\mu\otimes\sigma_j^v,$$

where $$\sigma_i^\mu$$

represent the X, Y, and Z, Pauli operators on the ith qubit. While the orbital rotations preserve the form of the Hamiltonian in the fermionic case, local unitary rotations $U_R=R_1\otimes\ldots\otimes R_N$ preserve the form of the spin Hamiltonian, $$U_R^\dagger HU_R=\sum_{i,\mu}S_{i,\mu}U_R^\dagger\sigma_i^\mu U_R+\sum_{i,\mu}D_{i,j,\mu,v}U_R^\dagger\sigma_i^\mu\otimes\sigma_j^vU_R=\sum_{i,\mu}S_{i,\mu}R_i^\dagger\sigma_i^\mu R_i+\sum_{i,j,\mu,v}D_{i,j,\mu,v}R_i^\dagger\sigma_i^\mu R_i\otimes R_j^\dagger\sigma_j^vR_j.$$

Using the fact that the adjoint representation $R\otimes R^\dagger$ of the SU(2) transformations are SO(3) transformations O, we write $$U_R^\dagger HU_R=\sum_{i,\mu,m}S_{i,\mu}O_{m,i}^\mu\sigma_i^m+\sum_{i,j,\mu,v,m,n}D_{i,j,\mu,v}O_{m,i}^\mu O_{n,j}^v\sigma_i^m\otimes\sigma_j^n,$$

where the operators $O_i$ are determinant one, orthogonal, three-by-three matrices (i.e. SO(3)). Let $$L_i^m=Tr\left(\sigma_i^m\rho(\vec{\theta})\right)$$

and $$M_{ij}^{mn}=Tr\left(\sigma_i^m\otimes\sigma_j^n\rho(\vec{\theta})\right)$$

be the one- and two-body RDMs, respectively, of different Pauli products. Then the local-transformed energy expectation value is $$\langle H(R)\rangle=\sum_{i,\mu,m}S_{i,\mu}O_{m,i}^\mu L_i^m+\sum_{i,j,\mu,v,m,n}D_{i,j,\mu,v}O_{m,i}^\mu O_{n,j}^vM_{ij}^{mn}=\sum_i\vec{S}_i^TO_i\vec{L}_i+\sum_{i,j}Tr\left(D_{ij}O_iM_{ij}O_j^T\right).$$

Many combinatorial optimization problems can be recast as an Ising Hamiltonian energy minimization problem. The quantum approximate optimization algorithm [?] was proposed for generating approximate solutions to such optimization problems, in particular, focusing on the graph-theoretic problem of MAXCUT. The Hamiltonian considered in the QAOA algorithm is a standard classical Ising Hamiltonian $$H = \sum_{\langle i,j \rangle \in E} Z_i \otimes Z_j,$$

where E is the set of edges of the graph defining the MAXCUT problem. This Hamiltonian is a specific instance of the spin Hamiltonians considered above.

Figure 4:
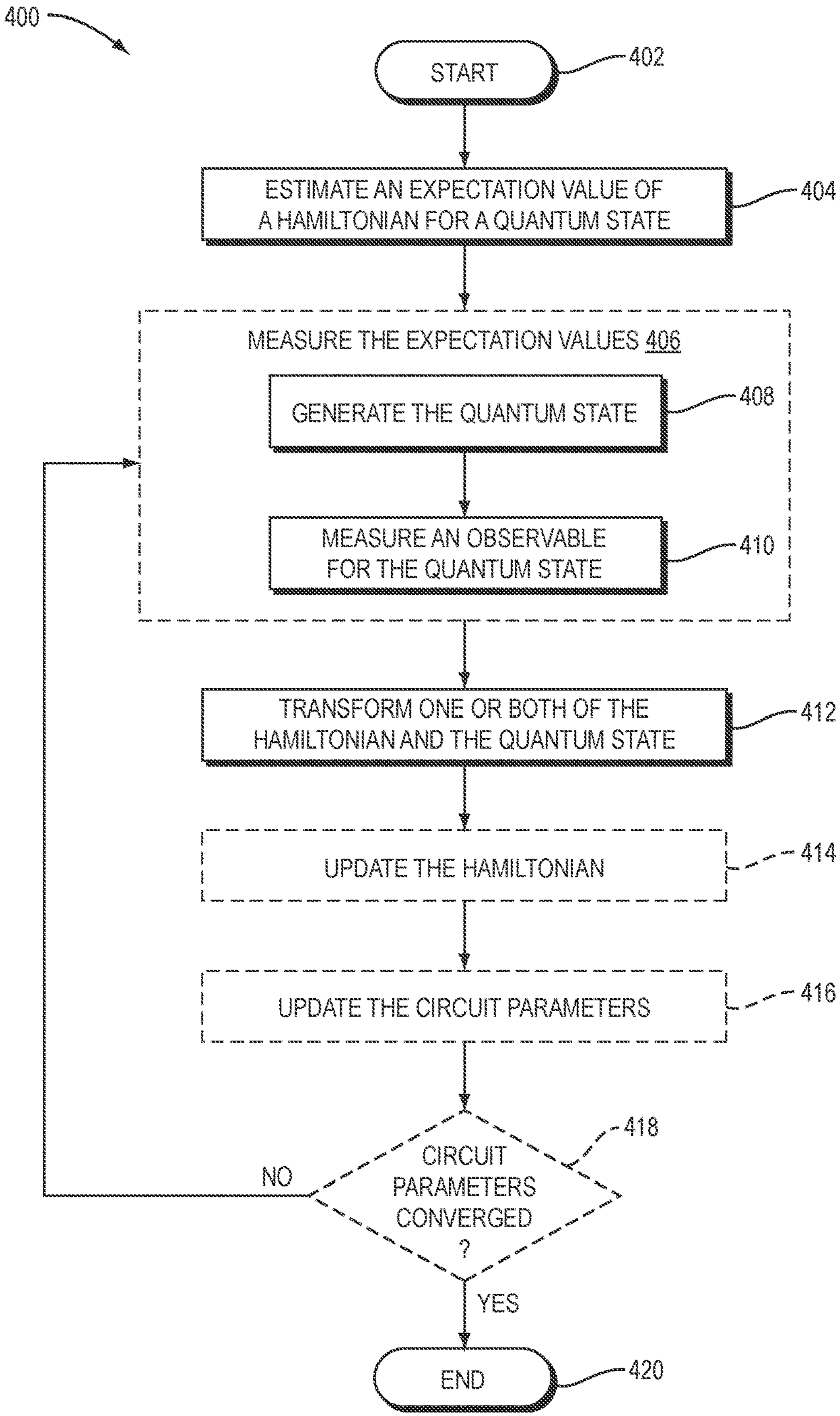
FIG. 4 is a flow chart of a quantum optimization method, in embodiments.

FIG. 4 is a flow chart of a quantum optimization method 400. Method 400 may be performed on either a classical computer, or a hybrid quantum-classical computer. Method 400 starts at a block 402. In a block 404, an expectation value of a Hamiltonian is estimated for a quantum state. The Hamiltonian is expressed as a linear combination of observables, and the Hamiltonian is estimated based on expectation values of the observables. In a block 412, one or both of the Hamiltonian and the quantum state are transformed to reduce the expectation value of the Hamiltonian. In one embodiment, the expectation value of the Hamiltonian is minimized in block 412. The minimization may be implemented with semidefinite programming techniques.

In some embodiments, method 400 includes a block 406 in which the expectation value of each of the observables is measured on a quantum computer. Block 406 may contain sub-blocks 408 and 410. In sub-block 408, the quantum state is generated on the quantum computer. In sub-block 410, an observable is measured with the quantum state to obtain the expectation value of the observable. For any one observable, sub-blocks 408 and 410 may be repeated to obtain sufficient statistics of the measurements to accurately determine the expectation value of the one observable. Sub-blocks 408 and 410 may also be repeated for all the observables so that all the expectation values are obtained via measurements on the quantum computer.

In some embodiments, method 400 includes a block 414 in which the Hamiltonian is updated based on the transforming in block 412. Block 414 may be implemented on a classical computer. For example, in block 412 a transformation (e.g., a unitary transformation) may be identified that, when applied either to the Hamiltonian or the quantum state, lowers the estimated energy (i.e., the expectation value of the Hamiltonian). In block 414, the Hamiltonian is updated by applying the identified transformation to the Hamiltonian to generate an updated Hamiltonian. The quantum state better approximates the ground state of the updated Hamiltonian, as compared to the Hamiltonian prior to updating.

In some embodiments, a parametrized quantum circuit, programmable via one or more circuit parameters, is used in sub-block 408 to generate the quantum state. In some of these embodiments, method 400 further includes a block 416 in which the circuit parameters are updated so that the parametrized quantum circuit outputs an updated quantum state that better approximates the ground state of the Hamiltonian (either before or after transforming in block 412). Block 416 may be implemented on a classical computer. For example, a classical optimization algorithm may be used to select the new circuit parameters to minimize a cost function that quantifies a distance between the quantum state and a target state (e.g., a ground state). The cost function may be based on the Hamiltonian prior to updating in block 416, or on the updated Hamiltonian generated in block 416.

In some embodiments, method 400 includes a decision 418 that checks for convergence of the circuit parameters. If, in decision 418, the circuit parameters are updated by an amount that is below a threshold, then the circuit parameters have converged and method 400 ends at block 420. If, in decision 418, the circuit parameters are updated by an amount that is above the threshold, then the circuit parameters have not converged and method 400 repeats blocks 406, 412, 414, and 416 to obtain a better approximation of the ground state and the corresponding ground-state energy. In sub-block 408, the parameterized quantum circuit receives the updated circuit parameters determined in block 416 to generate the updated quantum state. Blocks 406, 412, 414, and 416 may continue to repeat until it is determined in decision 418 that the circuit parameters have converged.

In other embodiments, block 406 (including sub-blocks 408 and 410) may be implemented on a classical computer rather than a quantum computer. In these embodiments, all of method 400 is implemented on the classical computer to simulate operation of the quantum computer. More specifically, in block 406, the expectation value of each of the observables may be determined on the classical computer. For example, the expectation value may be calculated deterministically via an equation or deterministic model. Alternatively, the expectation value may be determined stochastically (e.g., to simulate the randomness inherent to measurements performed on the quantum computer).

In some of the embodiments where all of method 400 is implemented on a classical computer, the quantum state may be represented on the classical computer as a first representation, in which case the first representation of the quantum state may be updated in block 416 instead of the circuit parameters. Blocks 406, 412, 414, and 416 may then be repeated until the first representation of the quantum state converges.

In some embodiments of method 400, the linear combination of the observables includes at least one observable with a zero weight that becomes non-zero when the Hamiltonian is transformed in block 412. In these embodiments, the expectation value of an observable with a zero weight will not contribute to the expectation value of the Hamiltonian. However, after the Hamiltonian is transformed in block 414, the zero weight for the observable may become non-zero, in which the expectation value of the observable will contribute to the expectation value of the Hamiltonian. Thus, in these embodiments, the expectation values of the observables include an expectation value for the at least one observable with a zero weight.

In other embodiments of method 400, a fermionic transformation is applied, in block 412, to one or both of the Hamiltonian and the quantum state. In some of these embodiments, the fermionic transformation include rotations of active orbitals. The fermionic transformation may include transformations out of an active space, of the active orbitals, to incorporate at least one of a core orbital and a virtual orbital. The fermionic transformation may include rotations that respect one or more of an open-shell spin symmetry, a closed-shell spin symmetry, and a geometric symmetry. In some of these embodiments, method 400 is implemented with a quantum subspace expansion technique, or a marginal projection technique, as described above. In other of these embodiments, the expectation values of the observables are obtained via orbital frames.

In other embodiments of method 400, a *Majorana* fermionic transformation is applied, in block 412, to one or both of the Hamiltonian and the quantum state. In some of these embodiments, the expectation value of the Hamiltonian is minimized using a Givens parameterization. In other of these embodiments, the expectation value of the Hamiltonian is minimized using semidefinite programming.

In other embodiments of method 400, a spin transformation is applied, in block 412, to one or both of the Hamiltonian and the quantum state. In some of these embodiments, the expectation value of the Hamiltonian is minimized using semidefinite programming.

In other embodiments of method 400, the Hamiltonian is an Ising Hamiltonian configured for solving a combinatorial optimization problem. In some of these embodiments, the expectation value of the Hamiltonian is minimized using semidefinite programming.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to an d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a $2^n \times 2^n$ complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled E). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
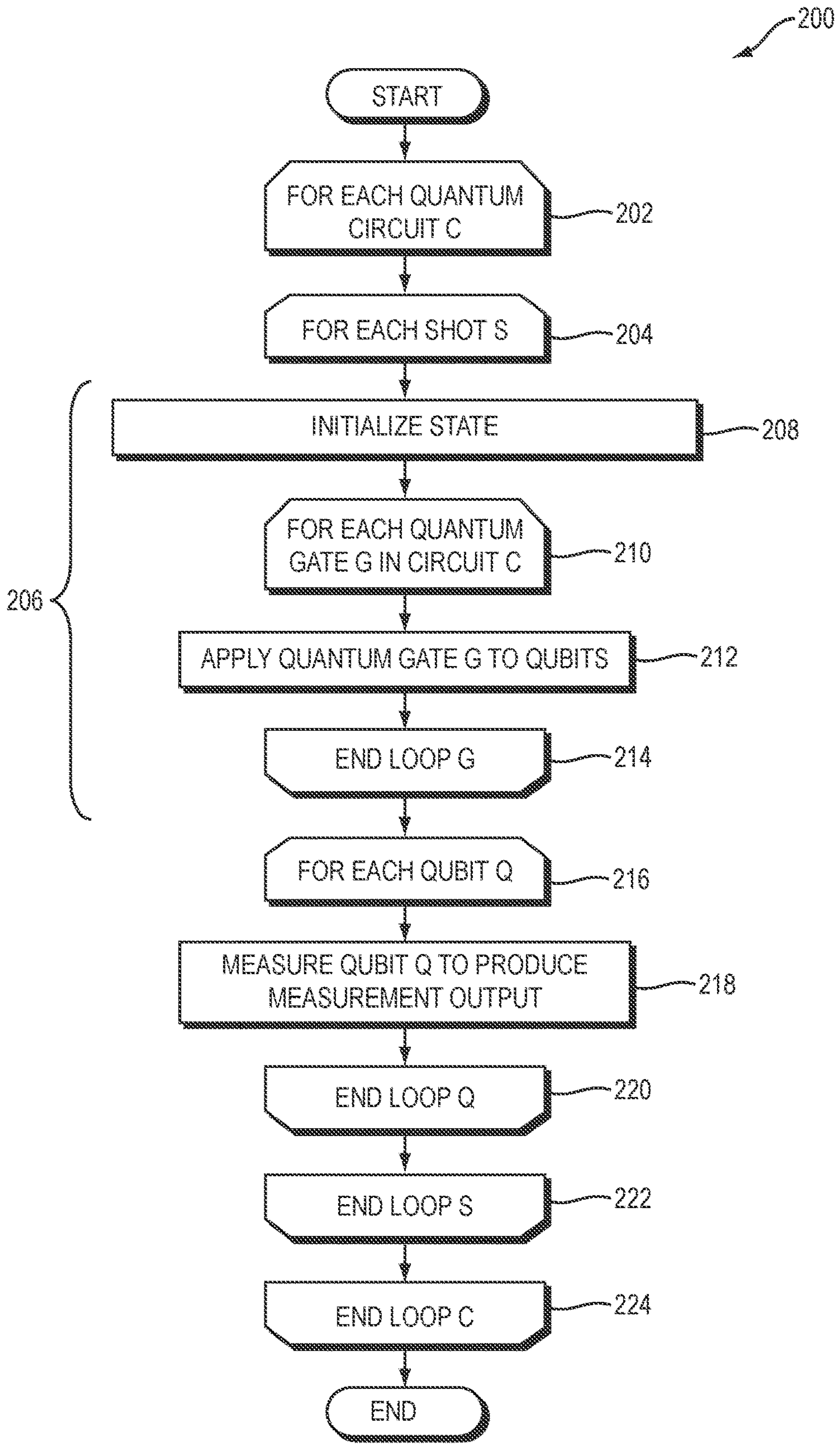
FIG. 2A is a flowchart of a method performed by the quantum computer of FIG. 1 according to one embodiment of the present invention.
Figure 2B:
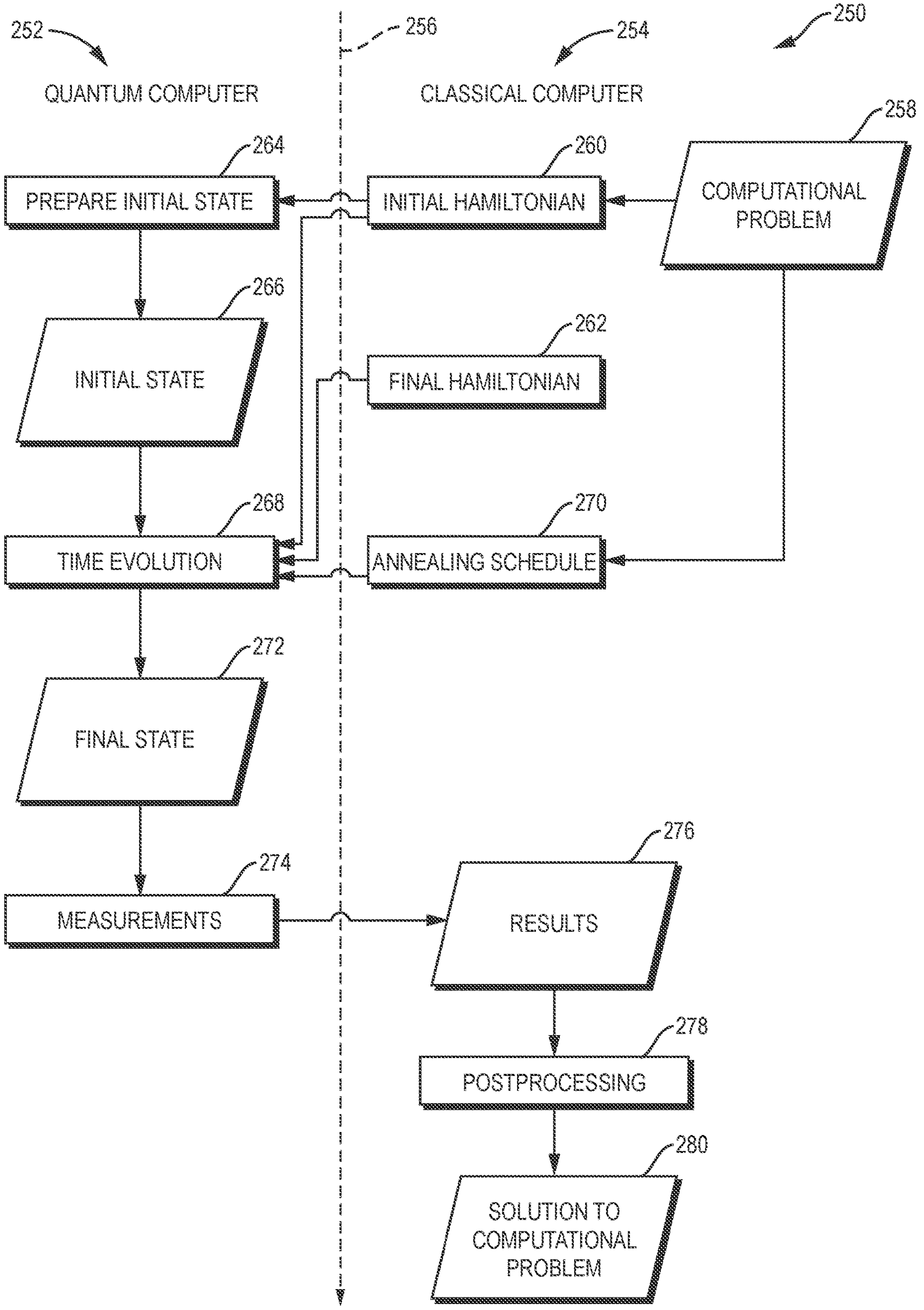
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original optimization problem 258. An experimental demonstration of the success of quantum annealing for random magnets was reported immediately after the initial theoretical proposal.

The final state 272 of the quantum computer 254 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general, the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:

In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signals 114 from the measurement unit 110 to the control unit 106. Such feedback signals 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206, beginning with "initial state" operation 208). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. W and X as elements of "state preparation" may instead be characterized as elements of gate application. Conversely, for example, some or all of the components and operations that are illustrated in FIGS. W and X as elements of "gate application" may instead be characterized as elements of state preparation. As one particular example, the system and method of FIGS. W and X may be characterized as solely performing state preparation followed by measurement, without any gate application, where the elements that are described herein as being part of gate application are instead considered to be part of state preparation. Conversely, for example, the system and method of FIGS. W and X may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIGS. 2A, operations 212 and 214).

Then, for each of the Q qubits 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
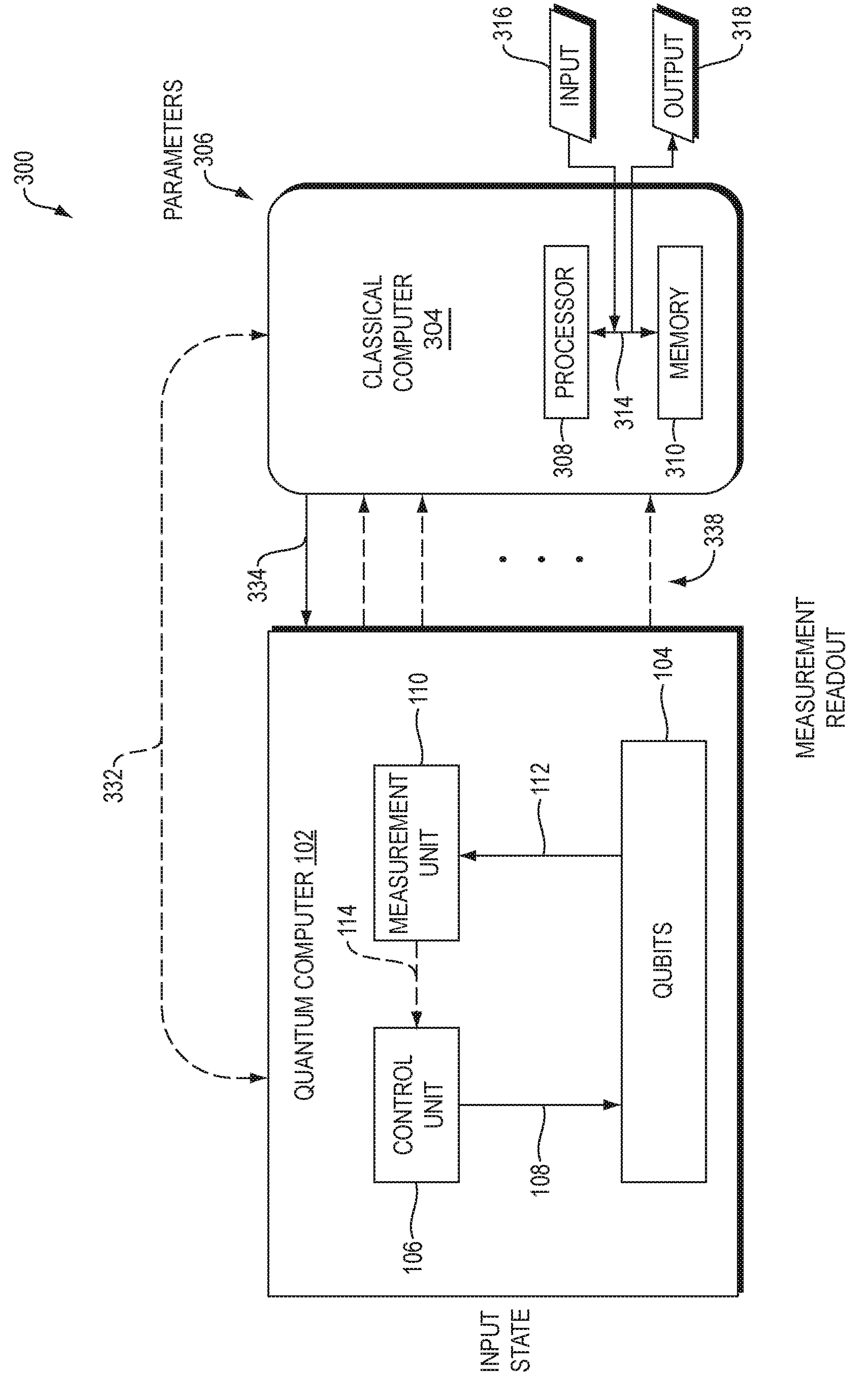
FIG. 3 is a diagram of a hybrid quantum-classical computer according to one embodiment of the present invention.

Referring to FIG. 3, a diagram is shown of a hybrid classical quantum computer (HQC) 300 implemented according to one embodiment of the present invention. The HQC 300 includes a quantum computer component 102 (which may, for example, be implemented in the manner shown and described in connection with FIG. 1) and a classical computer component 304. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the classical computer component 304, such as from a user input device such as a mouse, keyboard, or any other input device. The processor 308 may use instructions that have been read from the memory 310 to perform computations on data read from the memory 310 and/or the input data 316, and generate output from those instructions. The processor 308 may store that output back into the memory 310 and/or provide the output externally as output data 318 via an output device, such as a monitor, speaker, or network device. The HQC 300 may receive parameters 306.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals Y32 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals 334 to the quantum computer 102, in response to which the quantum computer 102 may apply the gate operations specified by the control signals 332 to the qubits 104, as a result of which the qubits 104 arrive at a final state. The measurement unit 110 in the quantum computer 102 (which may be implemented as described above in connection with FIGS. 1 and 2A-2B) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may be communicably coupled to the classical memory 310 to store data representing the measurement output 338 and/or data derived therefrom.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid classical quantum (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, in any practical use of embodiments of the present invention, carrying out the optimization of the energy expectation value will be computationally demanding and impossible to perform manually, or mentally. Even with a conservative estimate, millions of individual computational steps would be needed. Even solely using a classical computer, the routine is, in general, likely inefficient because generating a variety of valid marginal data is challenging due to the QMA-completeness of the quantum marginal problem.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element (s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

The invention claimed is:

1. A method for generating, for a quantum state, a reduced expectation value of an operator of a group of operators having same terms as a first operator, the method comprising:

generating the quantum state on a quantum computer;

measuring, by the quantum computer, observables for the quantum state to compute expectation values of the observables, resulting in quantum measurements;

receiving, by a classical computer, the quantum measurements;

receiving, by the classical computer, a first expectation value of the first operator for the quantum state;

generating, by the classical computer, a second operator of the group of operators; and generating, by the classical computer, the reduced expectation value from the quantum measurements and the second operator.

2. The method of claim 1, wherein generating the quantum state includes generating the quantum state with a parametrized quantum circuit programmable via one or more circuit parameters.

3. The method of claim 2, further comprising updating the one or more circuit parameters such that the parametrized quantum circuit outputs an updated quantum state that better approximates a ground state of the first operator.

4. The method of claim 3, further comprising repeating until the one or more circuit parameters have converged:

generating the quantum state with the parametrized quantum circuit;

measuring the observables for the quantum state;

transforming one or both of the first operator and the quantum state;

updating the first operator based on the transforming; and updating the one or more circuit parameters.

5. The method of claim 4, wherein transforming the one or both of the first operator and the quantum state includes applying a *Majorana* fermionic transformation to the one or both of the first operator and the quantum state.

6. The method of claim 5, further comprising minimizing the expectation value of the first operator using a Givens parameterization.

7. The method of claim 5, further comprising minimizing the expectation value of the first operator using semidefinite programming.

8. The method of claim 4, wherein transforming the one or both of the first operator and the quantum state includes applying a spin transformation to the one or both of the first operator and the quantum state.

9. The method of claim 4, wherein transforming the one or both of the first operator and the quantum state includes minimizing the expectation value of the first operator estimated for the quantum state.

10. The method of claim 9, wherein minimizing the expectation value of the first operator includes minimizing the expectation value of the first operator using semidefinite programming.

11. The method of claim 3, wherein the first operator is an Ising Hamiltonian configured for solving a combinatorial optimization problem.

12. The method of claim 1, wherein the group of operators comprises a set of unitary transformations applied to the first operator.

13. The method of claim 1, wherein the group of operators comprises a set of operators transformed under a fermionic transformation.

14. The method of claim 13, the fermionic transformation including rotations of active orbitals.

15. The method of claim 13, the fermionic transformation including transformations out of an active space to incorporate at least one of a core orbital and a virtual orbital.

16. The method of claim 13, the fermionic transformation including rotations that respect one or more of an open-shell spin symmetry, a closed-shell spin symmetry, and a geometric symmetry.

17. The method of claim 13, further comprising implementing a marginal projection technique.

18. The method of claim 13, further comprising obtaining any of the expectation values of the observables via orbital frames.

19. A computing system configured for generating, for a quantum state, a reduced expectation value of an operator of a group of operators having same terms as a first operator, the computing system comprising:

a processor;

a memory communicably coupled with the processor and storing machine-readable instructions that, when executed by the processor, control the computing system to:

generate the quantum state on a quantum computer;

measure, by the quantum computer, observables for the quantum state to compute expectation values of the observables, resulting in quantum measurements;

receive, by a classical computer, the quantum measurements;

receive, by the classical computer, a first expectation value of the first operator for the quantum state;

generate, by the classical computer, a second operator of the group of operators, and generate, by the classical computer, the reduced expectation value from the quantum measurements and the second operator.

* * * * *